United States Patent
Devolites et al.

(10) Patent No.: US 9,602,367 B2
(45) Date of Patent: Mar. 21, 2017

(54) SYSTEM, METHOD, AND COMPUTER PROGRAM PRODUCT FOR CREATING A HEADER DETAIL RECORD

(71) Applicant: TEOCO CORPORATION, Fairfax, VA (US)

(72) Inventors: John A. Devolites, Oakton, VA (US); David Corley, Fairfax, VA (US)

(73) Assignee: TEOCO Corporation, Fairfax, VA (US)

( * ) Notice: Subject to any disclaimer, the term of this patent is extended or adjusted under 35 U.S.C. 154(b) by 36 days.

(21) Appl. No.: 14/210,459

(22) Filed: Mar. 14, 2014

(65) Prior Publication Data

US 2014/0293807 A1    Oct. 2, 2014

Related U.S. Application Data

(60) Provisional application No. 61/802,177, filed on Mar. 15, 2013.

(51) Int. Cl.
*H04L 29/08* (2006.01)
*G06F 15/16* (2006.01)
*H04L 12/26* (2006.01)
*H04L 12/14* (2006.01)

(52) U.S. Cl.
CPC .......... *H04L 43/04* (2013.01); *H04L 12/1482* (2013.01)

(58) Field of Classification Search
None
See application file for complete search history.

(56) References Cited

U.S. PATENT DOCUMENTS

| | | | |
|---|---|---|---|
| 7,269,647 B2 | 9/2007 | Chang et al. | |
| 2007/0016694 A1* | 1/2007 | Achler | H03M 7/3088 709/247 |
| 2007/0121599 A1* | 5/2007 | Soo | H04M 1/57 370/356 |
| 2008/0159293 A1* | 7/2008 | Tamai | H04L 47/10 370/392 |
| 2008/0225862 A1* | 9/2008 | Wartenberg | H04L 69/04 370/400 |
| 2010/0080133 A1 | 4/2010 | Oron | |
| 2010/0312706 A1 | 12/2010 | Combet et al. | |
| 2011/0219126 A1* | 9/2011 | Aramoto | H04L 29/1232 709/228 |
| 2011/0280134 A1* | 11/2011 | Zheng | H04L 43/0811 370/241 |
| 2012/0254366 A1* | 10/2012 | Kusterer | H04L 43/04 709/219 |

(Continued)

*Primary Examiner* — Brandon Renner
(74) *Attorney, Agent, or Firm* — ATFirm PLLC; Ralph P. Albrecht

(57) ABSTRACT

A system, method, computer program product and computer processor-implemented method of generating a header detail record (HDR) for a hypertext transport protocol (HTTP) data browsing user accessing network resources, may include: receiving, by at least one computer processor, packet data from at least one probe tapping into at least one network element of a data network of a communications services provider, said packet data comprising: header data, and payload data; analyzing said packet data comprising: extracting at least one header detail record (HDR) from said header data and said payload data for all said packet data, and creating said at least one header detail record (HDR).

26 Claims, 13 Drawing Sheets

(56) References Cited

U.S. PATENT DOCUMENTS

2012/0278477 A1* 11/2012 Terrell ................ H04L 41/5009
709/224
2014/0219089 A1* 8/2014 Ericson ............... H04W 76/046
370/232

* cited by examiner

FIG. 13

SYSTEM, METHOD, AND COMPUTER PROGRAM PRODUCT FOR CREATING A HEADER DETAIL RECORD

CROSS REFERENCE TO RELATED APPLICATIONS

The present invention is a nonprovisional and claims the benefit under 35 USC 119(e) of and priority to U.S. Patent Application Ser. No. 61/802,177, entitled "System, Method, and Computer Program Product For Creating a Header Detail Record," filed on Mar. 15, 2013, of common assignee to the present invention, the contents of which is incorporated herein by reference in its entirety.

BACKGROUND OF THE INVENTION

Field of the Invention

The present invention relates to communications networks generally, and more particularly to tracking usage of Internet based flows on communications networks.

Discussion of the Related Art

Tracking usage of telecommunications calls, sessions, and chats has conventionally been enabled by the use of call detail records (CDRs). The use of CDRs to track a telephone call has long been used to track billing information of calls placed over the public switched telephone network (PSTN), and more recently over data networks using voice over internet protocol (VoIP) based telephony. Detailed telephone call reporting is made possible by the use of CDRs allowing businesses to allocate, e.g., but not limited to, long distance, and mobile telephony call usage, as well as enabling intercarrier billing.

A CDR, also known as call data record, is a data record produced by a telephone exchange, switch, or other telecommunications equipment documenting the details of a phone call that passed through a facility or communications network device. A CDR is the automated equivalent of a paper toll ticket that was written and timed by operators to track long-distance calls for billing in a manual telephone exchange.

A CDR is conventionally composed of fields that describe the communications exchange. Examples of fields include, e.g., but not limited to, a phone number (ANI) making a call (i.e., calling party), a phone number receiving the call (i.e., called party), time when the call started (e.g., date and time), how long in time the call lasted (e.g., duration), the phone number to be charged for the call (e.g., regular, private, collect, or intercarrier, etc.), an identifier of the telephone exchange writing the record, a sequence number identifying the record, additional digits on the called number used to route or charge the call (e.g., long distance, international, area code, operator-assisted, etc.), the result of the call (e.g., whether it was answered, completed, busy, etc.), the route by which the call entered the exchange, the route by which the call left the exchange, a call type (e.g., voice, short message service (SMS), VoIP, etc.), and any fault condition encountered, etc.

Conventionally, an exchange switch manufacturer may decide which information is captured and/or tracked and formatting of the information. Standards have developed for intercarrier billing. Examples of different information provided by vendors may include, e.g., but not limited to, sending a timestamp of an end of a call instead of duration, voice-only machines may not send call type, and some private branch exchange (PBX) devices may not send the calling party, etc.

CDRs were especially useful in a homogeneous circuit switched telecommunications network. Tracking calls has become more complicated as calls are no longer exclusively circuit switched calls, but rather may travel over heterogeneous data networks, with telephony calls often carried and/or terminated on one or more ends using VoIP communications.

Calls, sessions, Internet browser hypertext transport protocol (HTTP), instant messaging, video conferencing, digital radio, and other content based services can use vastly different amounts of communications network resources such as bandwidth. However, conventional usage tracking does not track such data usage, beyond perhaps only volume of data uploaded or downloaded. Although data network usage has grown in an accelerated fashion, means to track Internet Protocol (IP) user browsing activity have been minimal at best. With increased access speeds, IP usage over time has shifted from largely an electronic mail (email) transport system to higher bandwidth, multimedia data delivery system. Various transfer protocols have enabled hyperlinked access to a vast array of multimedia content easing access to the burgeoning world wide web (WWW), using, e.g., but not limited to, hypertext transport protocol (HTTP), HTTP secure over secure socket layer (SSL) (HTTPS), browser based request response protocols using hypertext markup language (HTML), extensible markup language (XML), and application environments such as, e.g., but not limited to, Java, Flash, etc. Bandwidth usage has grown, fueled by widespread always online Internet service (rather than its precursor dial-up modem access), and ubiquitous handheld mobile devices including hardware devices smartphones (e.g. iPhone/iOS, Android, Windows Phone), WIFI enabled communications and computing devices, eReaders (e.g., Kindle), tablet devices (e.g., iPad, Kindle Fire, Android tablets, etc.), smart televisions, etc., and software environments, such as, e.g., but not limited to, social networks such as, e.g., but not limited to, Facebook, Linked-In, Myspace, etc., and network based offerings such as, e.g., but not limited to, cloud-based services, and video streaming services such as, e.g., but not limited to, Youtube, Hulu, Vimeo, Netflix, etc. This higher bandwidth IP session content, has grown exponentially, but means of tracking usage has languished behind. Traditional statistical sampling models using approaches such as Nielsen, Comscore, etc., have gathered aggregate scale usage information. However, conventional approaches fail to provide granularity of information to the user level. As mobile telephony service providers have found, unlimited data plans have driven wireless users to adopt similar usage patterns on mobile devices as wired online users, causing a shift to tiered-pricing based data plans to meter user utilization of resources. Conventional tiered pricing plans however can again only provide users minimal information about their usage, namely, for example, upload/download bandwidth usage on a monthly basis at a site such as, e.g., but not limited to www.my.verizon.net for Verizon wireless usage, for example.

As noted, in circuit-switched PSTN telephony, call detail records (CDRs) recorded data about a given call, but no similar data is available to track user Internet activity.

Behavior analysis also referred to as psychographics studies the behavior of users. Conventionally, behavior analysis tracks usage at an aggregated level, tracking numbers of users travelling to particular sites by analysis of log files, etc. Such information lacks details as to users, but rather tracks usage of a given site.

Advertising systems track user usage by means of cookies and the like, but such tracking does not measure all activity, since such tracking may be disabled by turning off browser based tracking.

Traffic analysis refers to a process of intercepting and examining messages in order to deduce information from patterns in communication. Traffic analysis can be performed even when messages are encrypted and cannot be decrypted. In general, the greater the number of messages observed, or even intercepted and stored, the more can be inferred from the traffic. Traffic analysis can be performed by law enforcement, or in the context of intelligence, military intelligence or counter-intelligence, and is a concern in computer security.

Traffic analysis tasks may be supported by dedicated computer software programs, including, e.g., but not limited to, commercially available programs such as those offered by i2, Visual Analytics, Memex, Orion Scientific, Pacific Northwest National Labs, Genesis EW's GenCOM Suite, SynerScope and others. Advanced traffic analysis techniques may include various forms of social network analysis.

In the field of telecommunications, data retention (or data preservation) generally refers to the storage of call detail records (CDRs) of telephony and internet traffic and transaction data (IPDRs) by governments and commercial organizations. In the case of government data tracking and/or retention, the data stored is usually of telephone calls made and received, emails sent and received and to the extent available by conventional techniques, web sites visited. Location data of originating and/or terminating parties may also be collected. For example, the National Security Agency seeks to perform mass surveillance or analysis of communications traffic. By analyzing retained data, governments can identify locations of individuals, an individual's associates, and members of a group such as, a terrorist cell, or the like. Such surveillance activities may or may not be lawful, depending on a region's laws, and constitutions and laws of a given country. In many jurisdictions access to such archives or databases may be made by a government with little or no judicial oversight (e.g., USA).

In the case of commercial data retention, data retained is usually transaction data, legal documents, or the like.

Data retention can also cover data collected by other means (e.g., by traffic cameras, or automatic drivers' plate recognition systems) and held by government and commercial organizations.

What is needed is an improved method of tracking detailed telecommunications network subscriber bandwidth usage and in particular greater granularity of usage for data based communications networks of such types as, e.g., but not limited to, voice networks, data networks, Cable TV (CATV), wireless, satellite, and voice over Internet Protocol (VoIP) networks, etc.

In today's broadband, wireless and VoIP networking world, a user may place calls, sessions, Internet browsing sessions, or voice or videoconferencing chats from any of various non-fixed locations, complicating tracking usage for a given subscriber. Thus, an improved method of tracking usage of calls, sessions, Internet browsing sessions, voice or videoconferencing chats providing greater detailed usage information to businesses and consumers than is conventionally possible, is needed.

SUMMARY OF THE INVENTION

Accordingly, the present invention is directed to a call, IP flow, or session tracking system, method and/or computer program product that overcomes one or more of the shortcomings of conventional solutions, due to limitations and disadvantages of the related art.

A system, method, computer program product and computer processor-implemented method of generating a header detail record (HDR) for a hypertext transport protocol (HTTP) data browsing user accessing network resources, may include: receiving, by at least one computer processor, packet data from at least one probe tapping into at least one network element of a data network of a communications services provider, said packet data comprising: header data, and payload data; analyzing said packet data comprising: extracting at least one header detail record (HDR) from said header data and said payload data for all said packet data, and creating said at least one header detail record (HDR).

The method, system or program product may include: wherein said at least one probe is compliant with a standard protocol may include at least one of: sflow; or netflow. The method, system or program product may include: wherein said header data may include at least one of: originating address of a packet of said packet data; destination address of a packet of said packet data; a source of a packet of said packet data; a destination of a packet of said packet data; or a size of a packet of said packet data.

The method, system or program product may include: wherein said enriching may include at least one of: determining by domain name service (DNS) lookup, a destination site being accessed.

The method, system or program product may include: said analyzing may include: determining by deep packet inspection the HTTP traffic being transported in at least one packet.

The method, system or program product may include: wherein said determining by deep packet inspection may include at least one of: mediating data; reducing data to a cube; compressing data for transmission; drilling down into encapsulated packet data; analyzing proxied packets to determine source of said packet; determining a flow associated with said packet; determining a subscriber associated with said packet; or determining a session associated with said packet.

The method, system or program product may include: wherein said determining by deep packet inspection may include determining a session associated with said packet may include identifying with regards to said session at least one of: a customer identifier (ID) of said session; a destination of said session; a requester of said session; or at least one category of said session. The method according to claim 1, further comprising: d. creating at least one actionable result based on said at least one HDR, wherein said at least one actionable result comprises at least one of: providing detailed usage statistics or results, by subscriber, comprising at least one of websites accessed, or HTTP requests opened; or providing backup detail for data access network resources comprising at least one of: for billing for consumption or nonconsumption billing utilization; for use in retail applications; for use in nonretail applications; for use in wholesale applications; for use in Internet Service Provider (ISP) usage tracking; for mobile phone usage statistics tracking; for mobile device usage statistics tracking; or for independent verification of third party roaming volume.

The method, system or program product may further include: transmitting to a header record generator service provider at least one of: at least one header record; at least one domain name service (DNS) record; at least one header detail record (HDR); or at least one search record.

The method, system or program product may further include: transmitting to a header record generator service provider compressed data comprising at least one of: at least one header record; at least one domain name service (DNS) record; at least one header detail record (HDR); or at least one search record.

The method, system or program product may further include: compressing raw data to be transmitted to a service provider. The method according to claim 1, further comprising: managing received compressed data.

The method, system or program product may further include: wherein said managing comprises: managing centrally said received compressed data.

The method according to claim 1, wherein said receiving said packet data comprises receiving a plurality of feeds from a plurality of probes.

The method according to claim 1, wherein a subscriber has a plurality of IP addresses associated with the subscriber.

The method, system or program product may include: enriching said packet data.

The method, system or program product may include: creating at least one actionable result based on said at least one HDR.

The method, system or program product may include: organizing all of said at least one header detail records from said packet data by subscriber.

The method, system or program product may further include: aggregating said at least one HDR; and compressing said at least one aggregated HDR.

The method, system or program product may further include: transmitting said at least one compressed and aggregated HDR to a warehouse.

The method, system or program product may further include: encrypting said at least one compressed and aggregated HDR prior to said transmitting.

The method, system or program product may include: wherein said at least one computer processor is at least one of monitored, controlled, or managed centrally.

The method, system or program product may further include: at least one of: monitoring; controlling; managing; managing at least one file; or managing one or more errors.

The method, system or program product may include: at least one of: loading said at least one file; enriching said received data comprising at least one of: enriching in a shallow manner comprising at least one of: looking up a name; looking up a domain name service (DNS); using an IP address to determine location; enriching with a location; enriching with a site; enriching with an address; enriching with an owner; determining identity of user of IP address; determining who owns the name; enriching with a site category; enriching with a subscriber; associating a pricing plan; associating device information; determining cost information; determining a device causing a spike in traffic at a given time; determining a subscriber causing a spike in traffic at a given time; determining popular sites for a given device; determining a website attracting most traffic; identifying subscribers using a social networking site; categorizing sites and tying to a subscriber; determining a percentage of traffic on portal versus off portal; determining a domain visited consistently by at least a given percentage of users over a given period of time including over a lengthy period of time of up to a year or more; determining a domain gaining in popularity over a given period of time including up to a month, or more; determining usage of a given application store over a period of time; determining a percentage of users accessing a carrier portal; determining most popular video content providers; determining most popular audio content providers; determining most popular gaming portals; determining most popular digital radio stations; determining most popular content portals; or determining carrier costing information to carry at least one of a call, session, or interaction; or enriching in a deep manner comprising at least one of: finger printing a device; identifying a device; determining a type of device; determining if there are discrepancies with expectations; identifying content; identifying audio content; identifying video content; identifying application content; identifying game content; enriching with compliance; enriching with determining whether acceptable use; determining whether there is a digital rights management (DRM) violation; determining whether someone is transferring an iTunes file from a non-iTunes location; determining types of content being downloaded; determining average pages visited per session; determining support for billing detail; determining other customer activity when streaming music; determining correlations between types of usage; determining correlations between activity and at least one of: online or on session activity; determining whether at least one of customers, devices or plans, having devices ideal for music streaming, actually use the devices for music streaming; determining whether TV streamers are also social networkers; determining correlations between different types of activity; determining customer segments adopting technologies; determining customer segments associated with content; determining demographics of users associated with content; determining customer segments adopting instant messaging; determining average number of voice over Internet Protocol (VoIP) sessions per month; determining correlations between VoIP usage and Skype usage; determining correlations between VoIP usage and other content; determining trends based on usage of a given content type; determining cannibalization of services; determining how simple message system (SMS) usage changes upon adopting instant messaging (IM); determining evolution of content usage over time; determining cannibalization of standard voice usage by VoIP usage; determining split between at least two of application, browser or widget initiated traffic; determining product mix; determining insight from an advertising perspective; determining subscribers generating advertising revenue; determining subscribers generating advertising revenue for a given advertiser; determining proportion of music from on-portal music store; determining proportion of games downloaded from on-portal application store; determining proportion of applications downloaded from on-portal application store; determining proportion of content downloaded from on-portal content store; determining a given number of popular games off portal downloaded for a given time period; determining a given proportion of activity at least one of on-portal, or off-portal; determining proportion of content off portal or on portal downloaded over a given time period; determining subscribers illegally downloading digital-rights-management (DRM) protected content; identifying VoIP activity in distributed environment; determining and storing long term trend data centrally; or determining whether someone is transferring an iTunes file from an iTunes location.

A system, method and computer program product may include: a. receiving compressed source records; b. decompressing said compressed source records into uncompressed source records; c. organizing said uncompressed source records by subscriber into subscriber organized source records; and d. storing said subscriber organized source records in at least one data repository.

A system, method and computer program product may include wherein said receiving compressed source records comprises: receiving a plurality of feeds from a plurality of probes.

A system, method and computer program product may include wherein said compressed source records comprise: encrypted compressed source records and further comprising: decrypting said encrypted compressed source records.

A system, method and computer program product may include: wherein each subscriber has a plurality of IP addresses associated with the each subscriber.

It is to be understood that both the foregoing general description and the following detailed description are exemplary and explanatory and are intended to provide further explanation of the invention as claimed, but are not to be understood as limiting.

BRIEF DESCRIPTION OF THE DRAWINGS

The accompanying drawings, which are included to provide a further understanding of the invention and are incorporated in and constitute a part of this specification, illustrate exemplary, and nonlimiting embodiments of the invention and together with the description serve to explain the principles of the invention.

In the drawings, like reference numbers indicate substantially similar, equivalent, or exemplary elements, and the left most digits in the corresponding reference number indicate the drawing in which an element first appears.

FIG. 13 depicts an exemplary embodiment of a block diagram of an exemplary voice over data network providing an exemplary data network service between subscriber devices, according to one exemplary embodiment.

DETAILED DESCRIPTION OF VARIOUS EXEMPLARY EMBODIMENTS

Reference will now be made in detail to various exemplary embodiments of the present invention, examples of which are illustrated in the accompanying drawings. A preferred exemplary embodiment of the invention is discussed in detail below. While specific exemplary embodiments are discussed, it should be understood that this is done for illustration purposes only. A person skilled in the relevant art will recognize that other components and configurations may be used without parting from the spirit and scope of the invention.

Figure 1A:
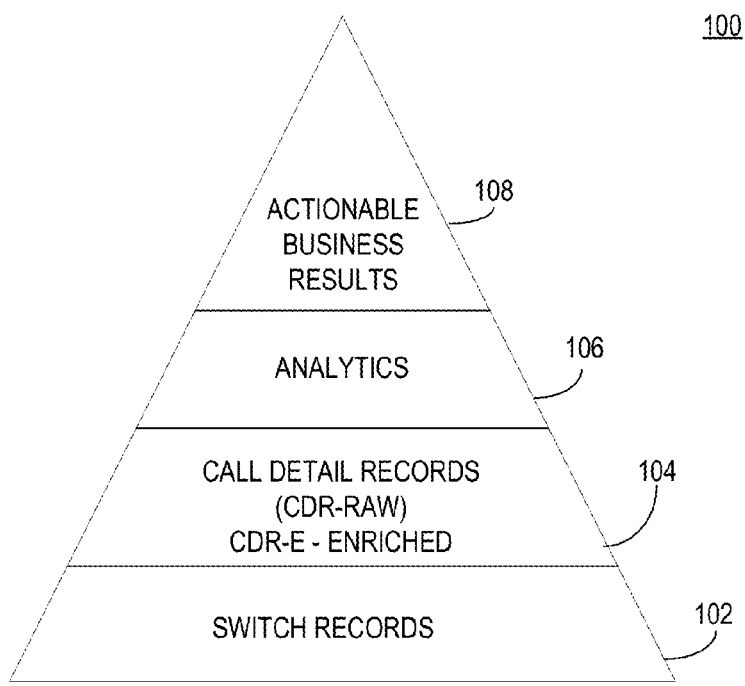
FIGS. 1A and 1B illustrate, respectively, a conventional call detail record (CDR) recording process, and an exemplary, but non-limiting, Internet Protocol (IP) session header detail record (HDR) call tracking process according to an exemplary embodiment of the present invention.

FIG. 1A illustrates an exemplary block diagram 100 depicting a conventional call detail record (CDR) recording process including, exemplary switch records 102 used to extract call detail records (CDRs) 104, which may be in raw form (CDR-RAW) initially, and after enrichment may be referred to as CDR-E, and analytics 106 may be performed on the CDRs and actionable business results 108 may be generated based on the analytics.

Figure 1B:
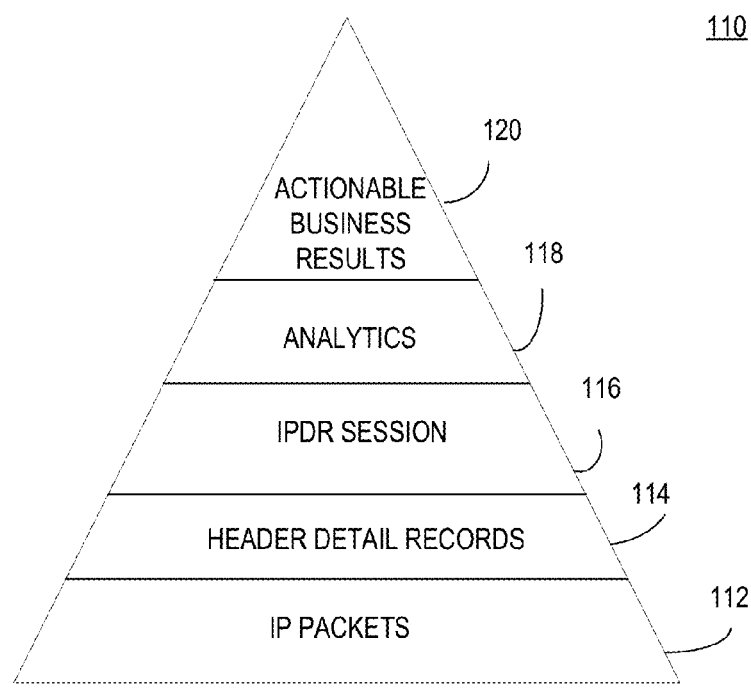

FIG. 1B illustrates an exemplary, but non-limiting, Internet Protocol (IP) session header detail record (HDR) call tracking process 110, including IP packets 112, from which header detail records (HDRs) may be captured or generated 114 by, e.g., but not limited to, inspecting headers of packets for information, or payloads using, e.g., deep packet inspection, etc., and identifying an IPDR session 116 with which the packet may be associated, and upon identifying the IPDR session, further analysis may be performed 118, and actionable business results may be initiated 120, according to an exemplary embodiment of the present invention.

Figure 2A:
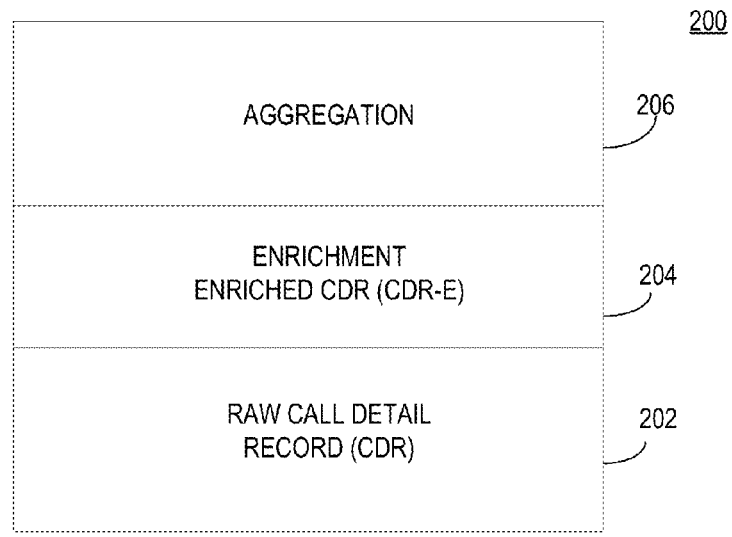
FIGS. 2A and 2B, respectively, illustrate an exemplary enrichment process of the conventional CDR process of FIG. 1A, and an exemplary enrichment process for the HDR of FIG. 1B according to an exemplary embodiment of the present invention.

FIG. 2A illustrates a diagram 200 of an exemplary enrichment process of the conventional CDR process of FIG. 1A, including taking a raw call detail record 202 and enriching the CDR into an enriched CDR (CDR-E) 204, and aggregation may further be performed 206, according to an exemplary embodiment of the present invention.

Figure 2B:
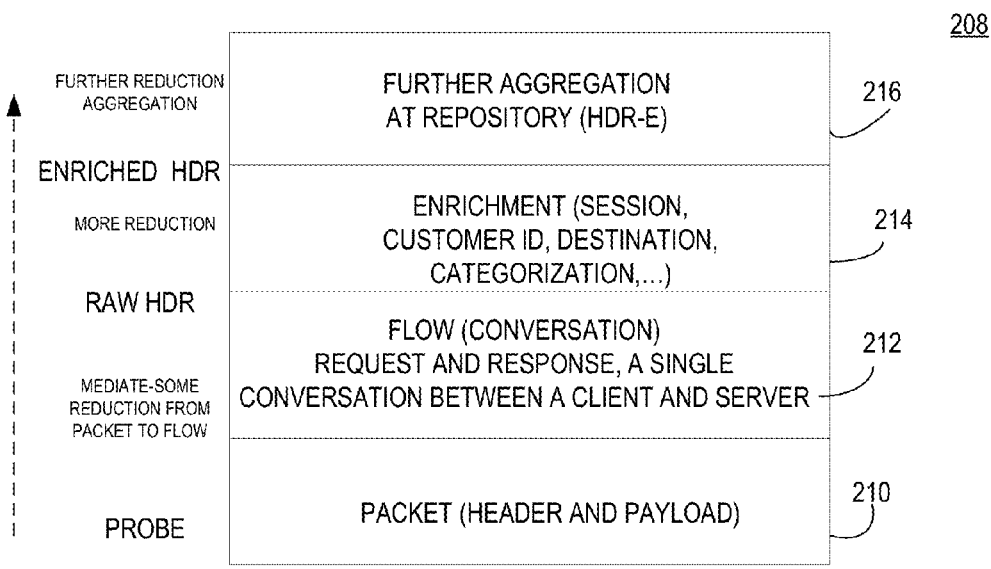

FIG. 2B illustrates an exemplary diagram 208 including an exemplary enrichment process 208 for the HDR of FIG. 1B, including taking the packet information 210 extracted by the probe 210, mediating to reduce some of the data from packet to flow, processing request and response, a conversation between a client and server 212, from this information extracted one obtains a raw HDR, then further enrichment may be performed 214, such as, e.g., but not limited to, obtaining a session, a customer identifier, a destination, a categorization, etc., further reducing the size of the HDR to obtain an enriched HDR, then the HDR may be transmitted, transferred, or transported to a repository for further reduction and aggregation at the repository 216, according to an exemplary embodiment of the present invention.

Figure 3:
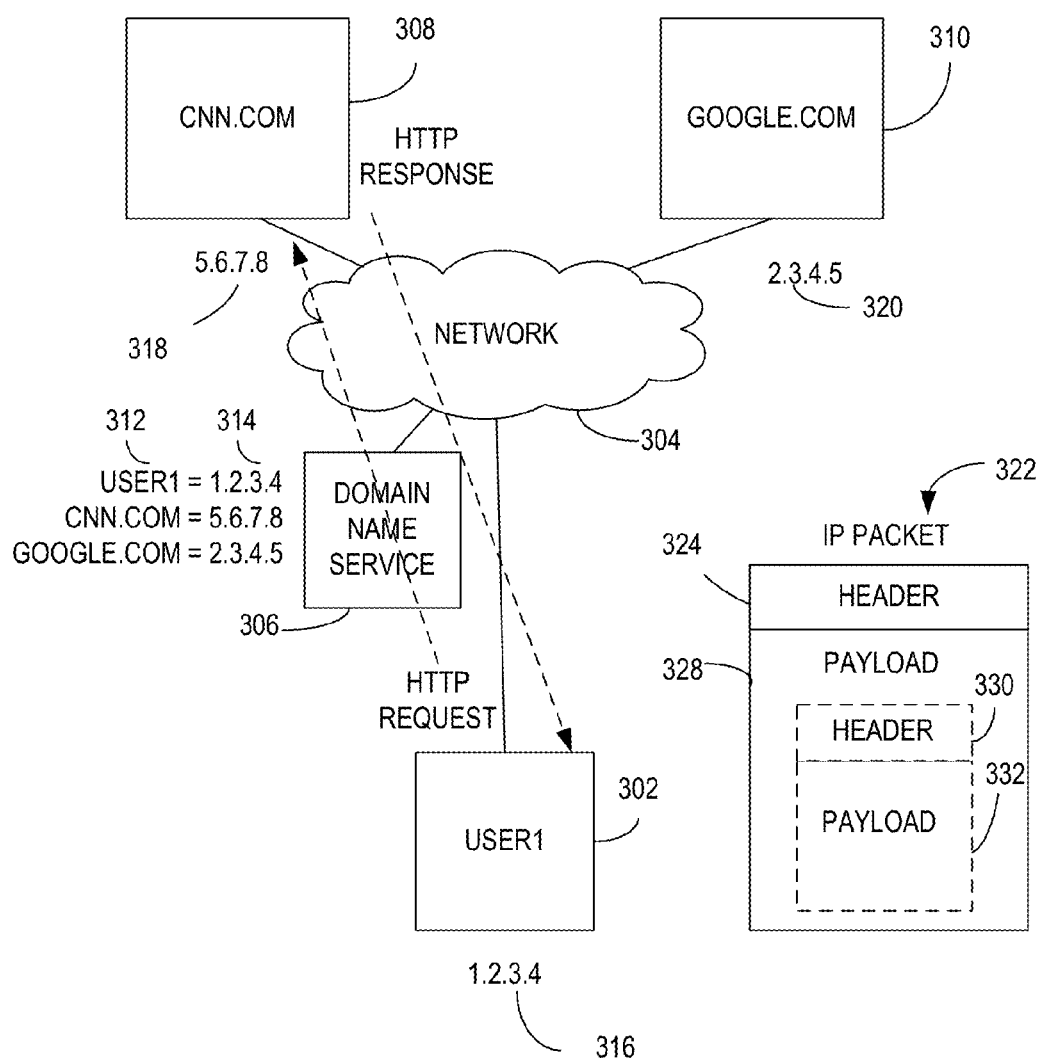
FIG. 3 illustrates an example Internet user's Internet browsing session interaction with an example domain name service and example web server, according to an exemplary embodiment of the present invention.

FIG. 3 illustrates an example block diagram 300, depicting an exemplary Internet workstation user1 302's Internet browsing session interaction from the user's host device 302 at IP address 1.2.3.4, making an exemplary HTTP request to a destination domain universal resource locator (URL) address of a web server 308 of CNN.COM at exemplary IP address 5.6.7.8 address 318, the request begins by querying the domain name service 306, which looks up cnn.com in a list of domain names 312 to find the corresponding internet address 314, and the request is routed to cnn.com device 308, with an example domain name service and example web server, according to an exemplary embodiment of the present invention. Similarly, a request to access google.com device 300 may be resolved by a lookup to DNS 306 and the request can then be routed over network 304 to device 310 of google.com at address 2.3.4.5 320, over network 304f. Each IP packet 322 may include a header portion 328, and a payload portion 328, which itself may encapsulate another packet having its own header 330 and payload 332.

Figure 4:
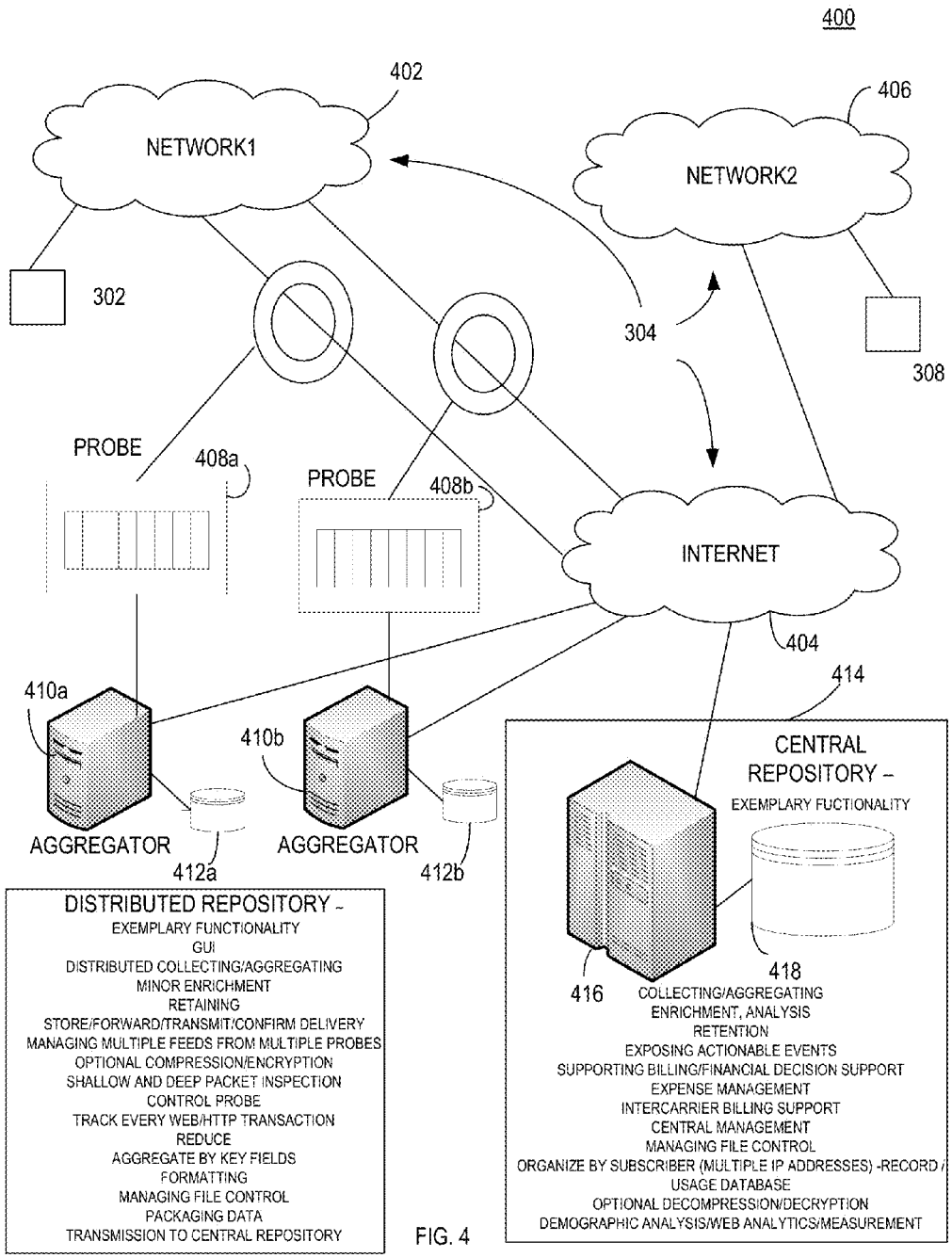
FIG. 4 illustrates an exemplary HDR capture and enrichment process according to an exemplary embodiment of the present invention.

FIG. 4 illustrates an exemplary diagram 400 depicting an exemplary HDR capture and enrichment process 400 by which a network1 402 of a service provider having various devices 302 coupled to it, the network1 402 may be coupled via internet 404 to other network2 406, which may be coupled to one or more devices 308, the networks may be part of a greater data network 304, and as illustrated, one or more probe devices 408a, 408b (collectively 408) may monitor transport of all IP packets transferred from the network1 402 to internet 404, and aggregator devices 410a, 410b, each with storage 412a, 412b, may be coupled to the probes 408a, 408b, respectively, where IP flows may be identified from the data extracted by the probes 408, to obtain header detail records (HDRs), the HDRs may be processed at the aggregators 410 in distributed fashion to perform some distributed enrichment, as illustrated, the HDRs, or HDR-Es, which may be transferred over the network 304 and Internet 404, as shown to a central repository 416 having central storage 418, which may have various exemplary functionality 414, as illustrated, according to an exemplary embodiment of the present invention. Various enrichments may be performed as illustrated, including, e.g., but not limited to, enrichment performed at the aggregator, and/or enrichment performed at the central repository, as shown. The exemplary distributed repository may include exemplary functionality including, e.g., but not limited to, a GUI, DISTRIBUTED COLLECTING/AGGREGATING, MINOR ENRICHMENT, RETAINING, STORE/FORWARD/TRANSMIT/CONFIRM DELIVERY, MANAGING MULTIPLE FEEDS FROM MULTIPLE PROBES, OPTIONAL COMPRESSION/ENCRYPTION, SHALLOW AND DEEP PACKET INSPECTION, CONTROL PROBE, TRACK EVERY WEB/HTTP TRANSACTION, REDUCE/AGGREGATE BY KEY FIELDS, FORMATTING, MANAGING FILE CONTROL, PACKAGING DATA, and/or TRANSMISSION TO CENTRAL REPOSITORY, etc. The exemplary central repository may include exemplary functionality including, e.g., but not limited to, a COLLECTING/AGGREGATING, ENRICHMENT, ANALYSIS, RETENTION, EXPOSING ACTIONABLE EVENTS, SUPPORTING BILLING/FINANCIAL DECISION SUPPORT, EXPENSE MANAGEMENT, INTERCARRIER BILLING SUPPORT, CENTRAL MANAGEMENT, MANAGING FILE CONTROL, ORGANIZE BY SUBSCRIBER (MULTIPLE IP ADDRESSES)-RECORD/USAGE DATABASE, OPTIONAL DECOMPRESSION/DECRYPTION, DEMOGRAPHIC ANALYSIS/WEB, and/or ANALYTICS/MEASUREMENT, etc. To provide the system of FIG. 4, for capturing HDRs for all traffic of a given telecommunications service provider, a probe and aggregator would have to be provided at each and every network gateway of the service provider to ensure that all packet traffic is captured, aggregated and transported to the repository for analysis.

Figure 5:
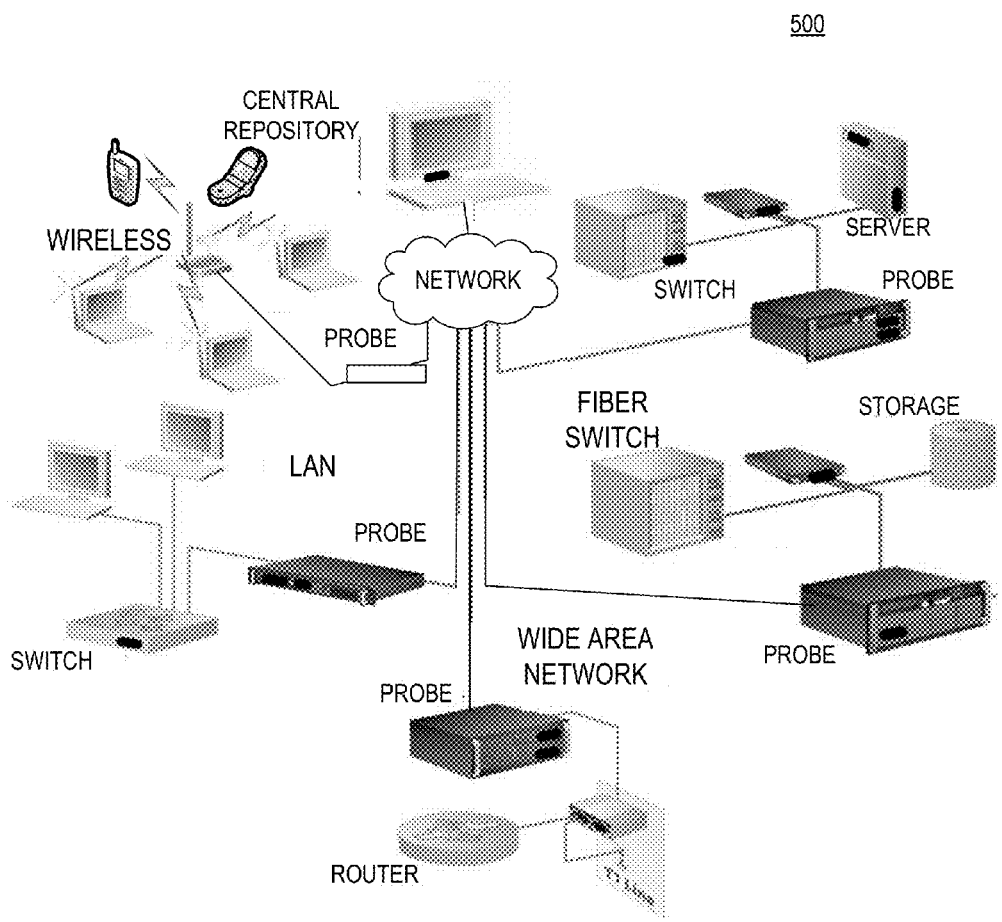
FIG. 5 illustrates an example environment illustrating capture of IP header data using exemplary data network probes and exemplary mediation aggregator devices, according to an exemplary embodiment of the present invention.

FIG. 5 depicts exemplary block diagram 500, illustrating an example environment illustrating capture of IP header data using exemplary data network probes and exemplary mediation aggregator devices, according to an exemplary embodiment of the present invention. As shown, the probes may be coupled to any of various devices including, e.g., but not limited to, a router, a switch, a network, a wireless access device, a server, a local area network (LAN) switch, a fiber switch, a device including a storage area network (SAN), a wide area network (WAN), etc.

Figure 6:
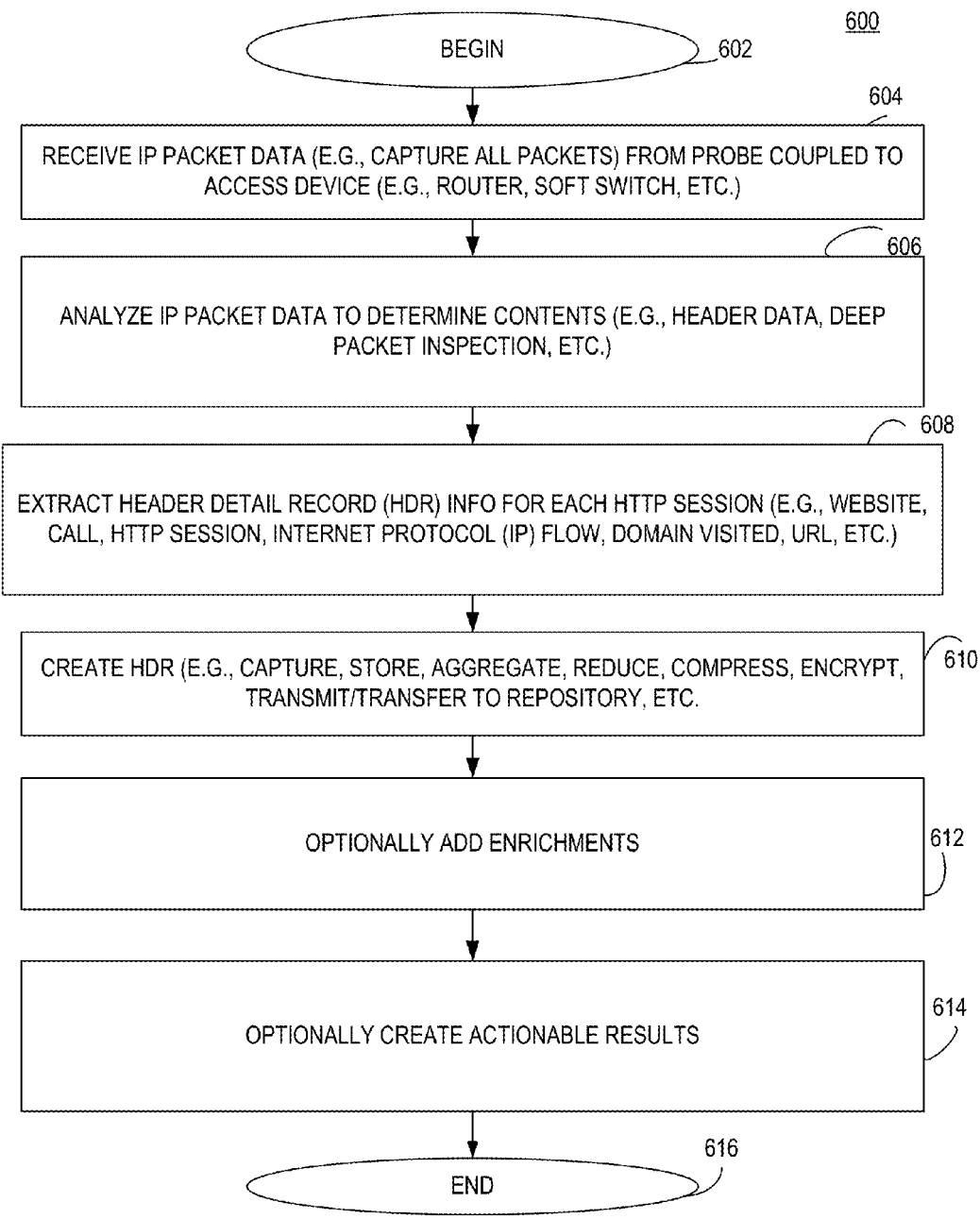
FIG. 6 illustrates an exemplary flow diagram depicting an exemplary HDR creation process according to an exemplary embodiment of the present invention.

FIG. 6 depicts an exemplary flow diagram 600 illustrating an exemplary HDR creation process 600 according to an exemplary embodiment of the present invention. Diagram 600 may begin with 602 and may continue immediately with 604.

In 604, a system, method or computer program product may receive Internet Protocol (IP) packet data (e.g., may capture all packets for a given mediation device, or all packets for an entire services provider to ensure all traffic is tracked), where the data is captured from a probe coupled to an exemplary mediation access device (e.g., router, soft switch, etc.). From 604, flow diagram 600 may continue with 606.

In 606, the system may analyze IP packet data to determine contents of the packet (e.g., header data may be analyzed, deep packet inspection, etc.). From 606, 600 may continue with 608.

In 608, the system may extract header detail record (hdr) info for each Internet protocol hyper text transport protocol (http) session (e.g., website, call, http session, internet protocol (IP) flow, domain visited, url, etc., may be captured). From 608, flow diagram 600 may continue with 610.

In 610, the system may create the hdr (including, e.g., but not limited to, capture, store, aggregate, reduce, compress, encrypt, transmit/transfer to repository, etc.). From 610, flow diagram 600 may continue with 612.

In 612, the system may optionally add enrichments, according to an exemplary embodiment. From 612, flow diagram 600 may continue with 614.

In 614, the system may optionally create actionable results as shown. From 614, the system may continue with 616, and may immediately end.

Figure 7:
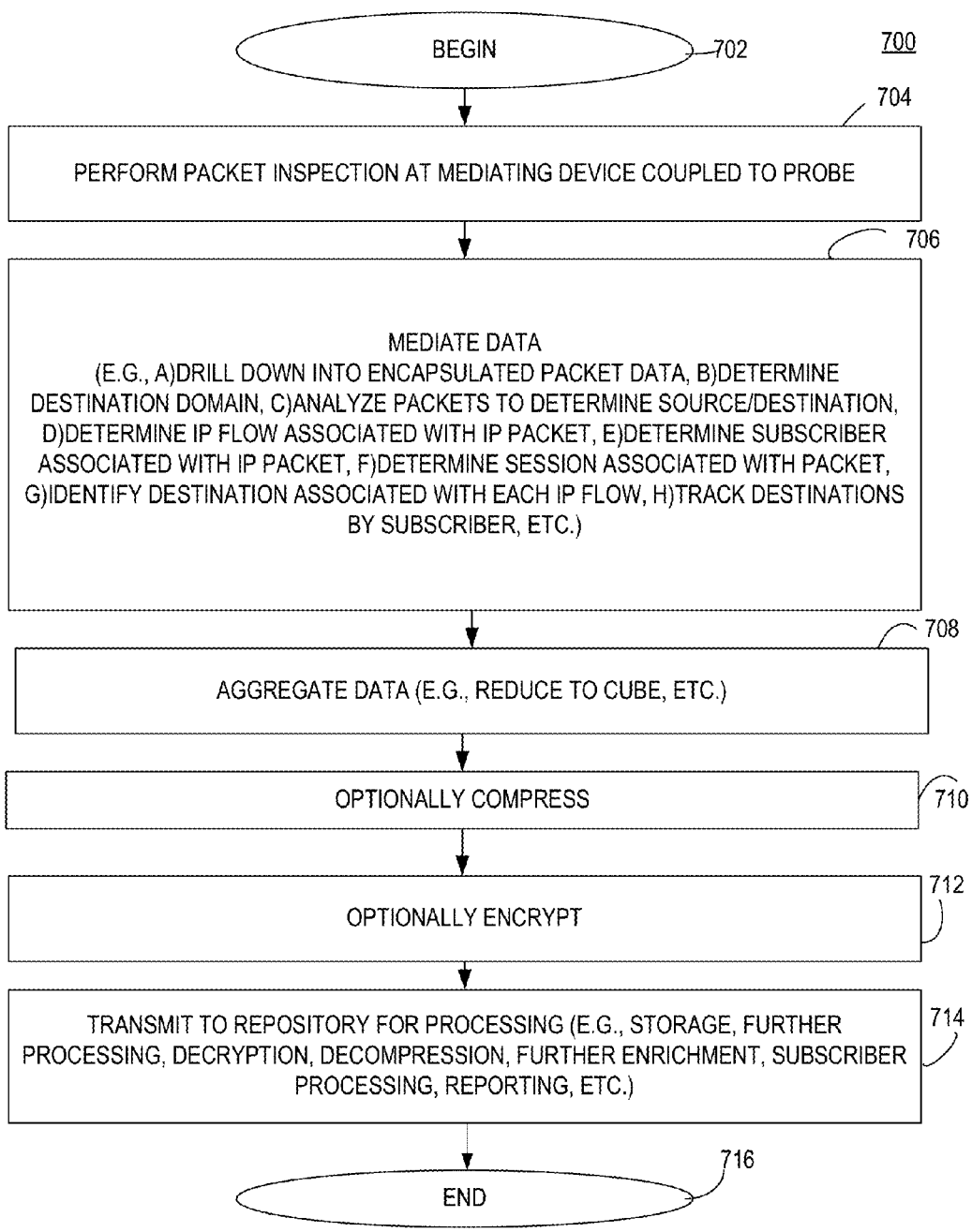
FIG. 7 illustrates an exemplary flow diagram depicting an exemplary deep packet inspection at a mediating device process according to an exemplary embodiment of the present invention.

FIG. 7 illustrates an exemplary flow diagram 700 depicting an exemplary deep packet inspection process at a mediating device process according to an exemplary embodiment of the present invention. Flow diagram 700 may begin with 702 and may continue immediately with 704.

In 704, the system, may perform packet inspection at the mediating device coupled to probe. From 704, flow diagram 700 may continue with 706.

In 706, the system may mediate data, such as, e.g., but not limited to, (e.g., a) drill down into encapsulated packet data, b) determine destination domain, c) analyze packets to determine source/destination, d) determine ip flow associated with ip packet, e) determine subscriber associated with ip packet, f) determine session associated with packet, g)

identify destination associated with each IP Flow, h) track destinations by subscriber, etc.) From 706, flow diagram 700 may continue with 708.

In 708, the system may aggregate data (e.g., reduce to a cube, etc.) From 708, flow diagram 700 may continue with 710.

In 710, the system may again, optionally compress the data. From 710, flow diagram 700 may continue with 712.

In 712, the system may optionally encrypt the HDR data. From 712, flow diagram 700 may continue with 714.

In 714, the system may transmit to repository for processing (e.g., storage, further processing, decryption, decompression, further enrichment, subscriber processing, reporting, etc.) From 714, the system may continue immediately with 716, ending.

Figure 8:
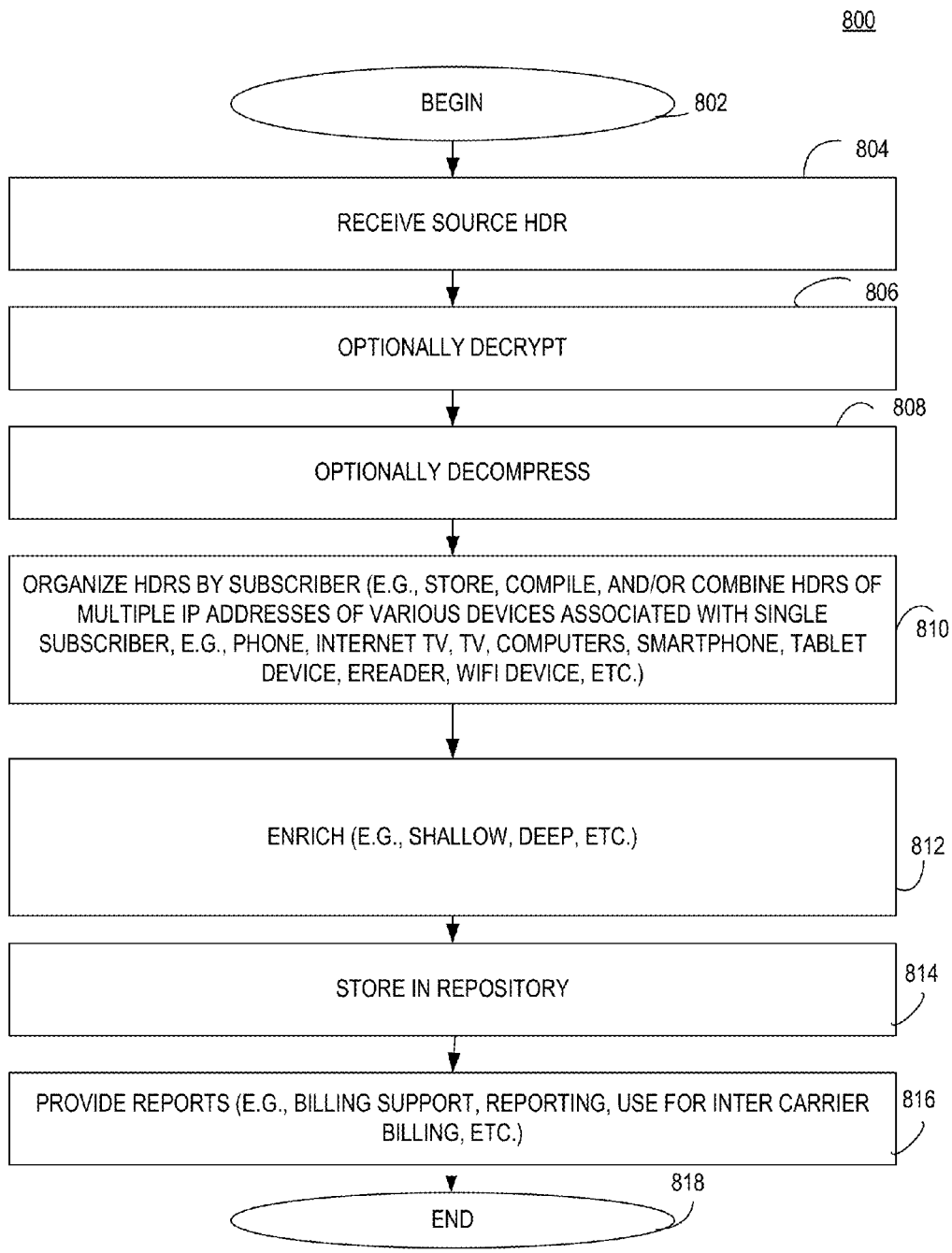
FIG. 8 illustrates an exemplary repository analysis process flow diagram according to an exemplary embodiment of the present invention.

FIG. 8 illustrates an exemplary repository analysis process flow diagram according to an exemplary embodiment of the present invention. Flow diagram 800 may begin with 802 and may immediately continue with 804.

In 804, the system may receive source hdr. From 712, flow diagram 700 may continue with 714.

In 806, the system may OPTIONALLY DECRYPT. From 712, flow diagram 700 may continue with 714.

In 808, the system may OPTIONALLY DECOMPRESS. From 712, flow diagram 700 may continue with 714.

In 810, the system may organize HDRS by subscriber (e.g., store, compile, and/or combine HDRs of multiple ID Addresses multiple IP addresseds of various devices associated with a single subscriber, e.g., phone, Internet TV, TV, computers, smartphone, tablet device, ereader, wifi device, etc.). From 810, flow diagram 800 may continue with 812.

In 812, the system may "Enrich (e.g., shallow, deep, etc.). From 812, flow diagram 800 may continue with 814.

In 814, the system may store in repository. From 814, flow diagram 800 may continue with 816.

In 816, the system may provide reports (e.g., billing support, reporting, use for inter carrier billing, etc.). From 816, flow diagram 800 may continue with 818, which may immediately end.

Figure 9:
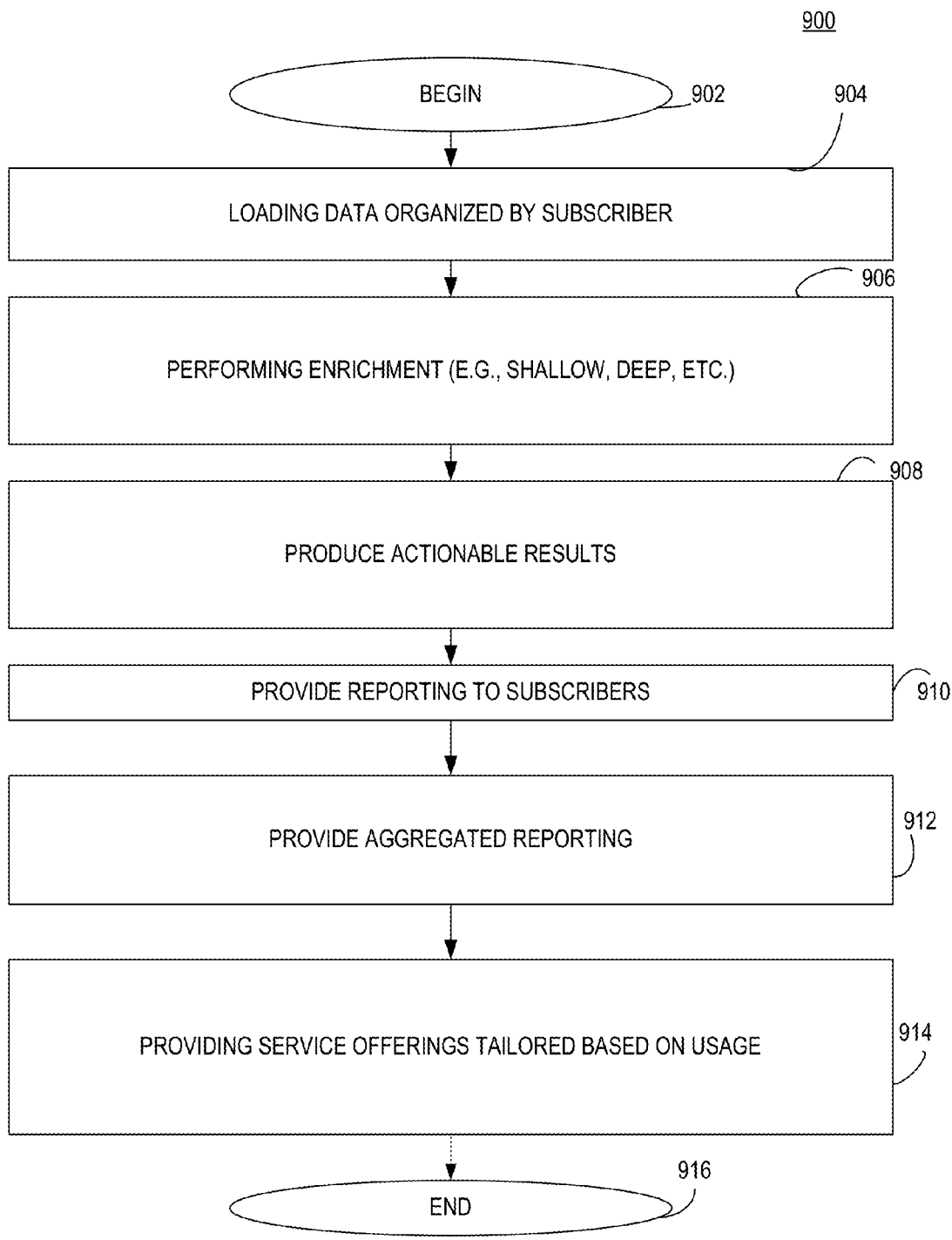
FIG. 9 illustrates an exemplary flow diagram of a process of computing exemplary enrichments and producing actionable results, according to an exemplary embodiment.

FIG. 9 illustrates an exemplary flow diagram 900 of a process 900 of computing exemplary enrichments and producing of actionable results, according to an exemplary embodiment. Flow diagram 900 may begin with 902 and may continue immediately with 904.

In 904, the system may load data organized by subscriber. From 904, flow diagram 900 may continue with 906.

In 906, the system may performing enrichment (e.g., shallow, deep, etc.). From 906, flow diagram 900 may continue with 908.

In 908, the system may produce actionable results. From 908, flow diagram 900 may continue with 910.

In 910, the system may provide reporting to subscribers. From 910, flow diagram 900 may continue with 912.

In 912, the system may provide aggregated reporting. From 912, flow diagram may continue with 914.

In 914, the system may provide service offerings tailored based on usage, according to an exemplary embodiment. From 914, flow diagram 900 may immediately end.

Figure 10:
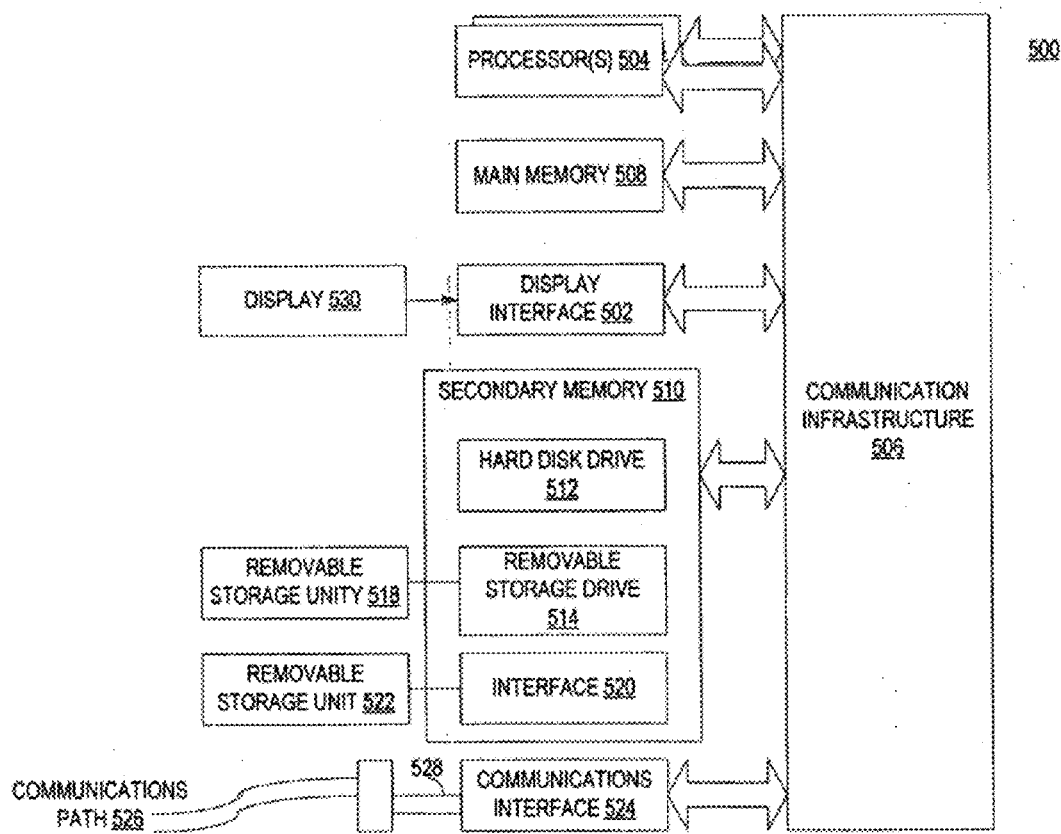
FIG. 10 illustrates an exemplary computing or communications device as may be used for various exemplary components of an exemplary communications network according to an exemplary embodiment of the present invention.

FIG. 10, described further below, illustrates an exemplary computing or communications device as may be used for various exemplary components of an exemplary communications network according to an exemplary embodiment of the present invention.

Figure 11:
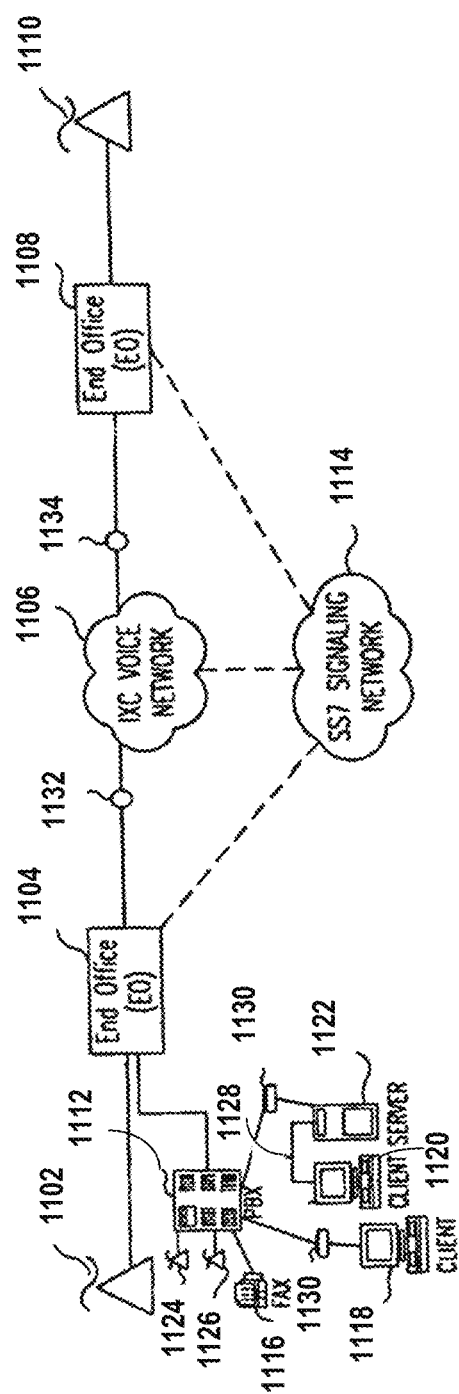
FIG. 11 depicts an exemplary embodiment of a block diagram providing an overview of an exemplary telecommunications network providing exemplary local exchange carrier (LECs) services within one or more local access and transport areas (LATAs).

FIG. 11 also described further below, depicts an exemplary embodiment of a block diagram providing an overview of an exemplary telecommunications network providing exemplary local exchange carrier (LECs) services within one or more local access and transport areas (LATAs).

Figure 12:
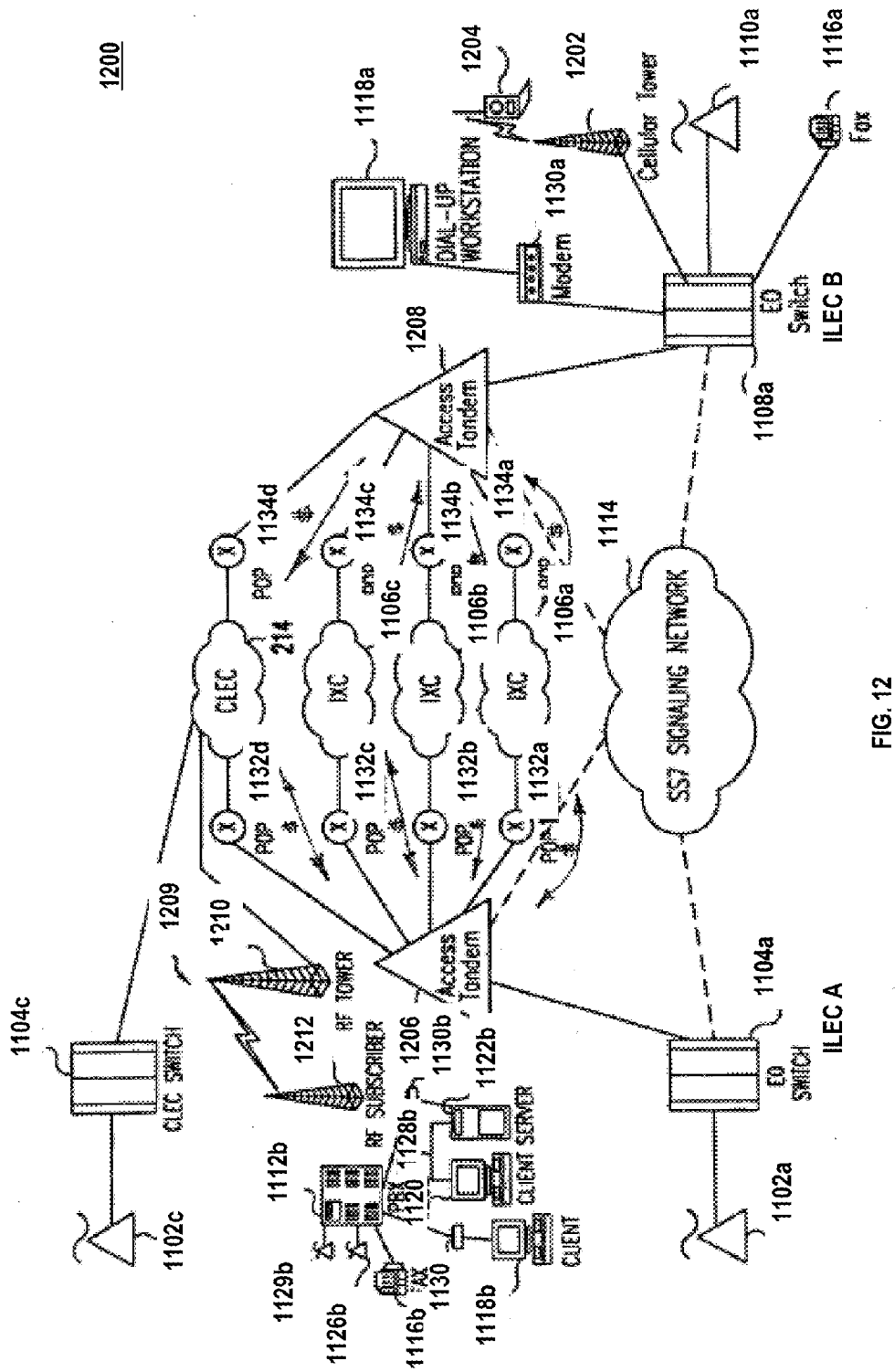
FIG. 12 depicts an exemplary embodiment of a block diagram illustrating an exemplary overview of a telecommunications network providing both local exchange carrier (LEC) and interexchange carrier (IXC) services between subscribers located in different local access and transport areas (LATAs).

FIG. 12 is also described below and depicts an exemplary embodiment of a block diagram illustrating an exemplary overview of a telecommunications network providing both local exchange carrier (LEC) and interexchange carrier (IXC) services between subscribers located in different local access and transport areas (LATAs).

Figure 13:
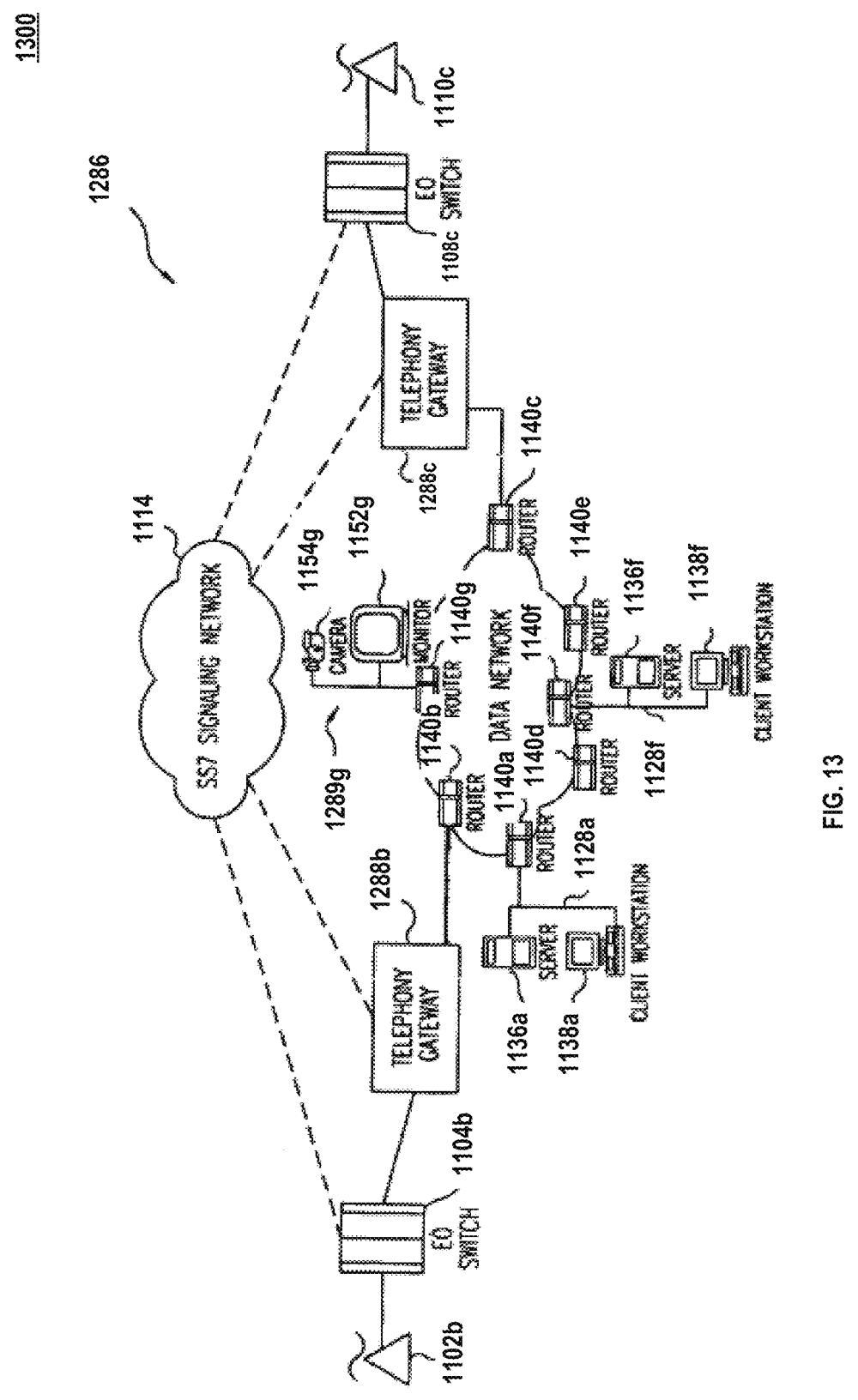

FIG. 13 is detailed below, and depicts an exemplary embodiment of a block diagram of an exemplary voice over data network providing an exemplary data network service between subscriber devices, according to one exemplary embodiment.

An Exemplary Computer System

FIG. 10 depicts an exemplary embodiment of a computer system that may be used in computing devices such as, e.g., but not limited to, client or server devices according to an exemplary embodiment of the present invention, communications devices, communications elements, telephony devices, softswitches, gateways, network elements, Internet Protocol (IP) elements, voice over IP devices, wireless devices, cellular phone devices, smartphone devices, routers, switches, etc. FIG. 10 depicts an exemplary embodiment of a computer system that may be used as a client device 1118, or a server device 1122, an exemplary communications device 1102, 1110, 1112, one or more components of 1106, 1104, 1108, 1114, 1116, 1124, 1120, 1130, 1124, 1126, 1132, 1134, 1210, 1212, 1206, 1202, 1204, 1208, 1209, 214, 1154, 1152, 1136, 1138, 1128, 1140, 1288, 1289, 1286, etc. described further below with reference to FIGS. 11-13. The present invention (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 500 is shown in FIG. 10, depicting an exemplary embodiment of a block diagram of an exemplary computer system useful for implementing the present invention. Specifically, FIG. 10 illustrates an example computer 500, which in an exemplary embodiment may be, e.g., (but not limited to) a personal computer (PC) system running an operating system such as, e.g., (but not limited to) WINDOWS MOBILE® for POCKET PC, or MICROSOFT® WINDOWS® NT/98/2000/7/Vista/XP/CE/8/Mobile, etc. available from MICROSOFT® Corporation of Redmond, Wash., U.S.A., SOLARIS® from SUN® Microsystems of Santa Clara, Calif., U.S.A., OS/2 from IBM® Corporation of Armonk, N.Y., U.S.A., Mac/OS, OS/X, and iOS from APPLE® Corporation of Cupertino, Calif., U.S.A., etc., or any of various versions of UNIX® (a trademark of the Open Group of San Francisco, Calif., USA) including, e.g., LINUX®, HPUX®, IBM AIX®, and SCO/UNIX®, etc. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 500 is shown in FIG. 10. Other components of the invention, such as, e.g., (but not limited to) a computing device, a communications device, a telephone, a personal digital assistant (PDA), a personal computer (PC), a handheld PC, handheld device, smart phone, tablet, laptop, notebook, cellular phone, wireless device, tablet, iPad, iPhone, Android device, client workstations, thin clients, thick clients, proxy servers, network communication servers, remote access devices, client computers, server computers, routers, web servers, data, media, audio, video, telephony or streaming technology servers, etc., may also be implemented using a computer such as that shown in FIG. 10.

The computer system 500 may include one or more processors, such as, e.g., but not limited to, processor(s) 504. The processor(s) 504 may be connected to a communication infrastructure 506 (e.g., but not limited to, a communications bus, cross-over bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 500 may include a display interface 502 that may forward, e.g., but not limited to, graphics, text, and other data, etc., from the communication infrastructure 506 (or from a frame buffer, etc., not shown) for display on the display unit 530.

The computer system 500 may also include, e.g., but may not be limited to, a main memory 508, random access memory (RAM), and a secondary memory 510, etc. The secondary memory 510 may include, for example, (but not limited to) a hard disk drive 512 and/or a removable storage drive 514, representing a floppy diskette drive, a magnetic tape drive, an optical disk drive, a compact disk drive CD-ROM, DVD, magneto-optical, optical, etc. The removable storage drive 514 may, e.g., but not limited to, read from and/or write to a removable storage unit 518 in a well known manner. Removable storage unit 518, also called a program storage device or a computer program product, may represent, e.g., but not limited to, a floppy disk, magnetic tape, optical disk, compact disk, etc. which may be read from and written to by removable storage drive 514. As will be appreciated, the removable storage unit 518 may include a computer usable storage medium having stored therein computer software and/or data.

In alternative exemplary embodiments, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 522 and interfaces 520, which may allow software and data to be transferred from the removable storage unit 522 to computer system 500.

Computer 500 may also include an input device such as, e.g., (but not limited to) a mouse or other pointing device such as a digitizer, touchscreen, video camera, video and/or audio video teleconferencing, telepresence device, microphone, and a keyboard or other data entry device (none of which are labeled), etc.

Computer 500 may also include output devices, such as, e.g., (but not limited to) display 530, and display interface 502, etc. Computer 500 may include input/output (I/O) devices such as, e.g., (but not limited to) communications interface 524, cable 528 and communications path 526, etc. These devices may include, e.g., but not limited to, a network interface card, and modems (neither are labeled). Communications interface 524 may allow software and data to be transferred between computer system 500 and external devices. Examples of communications interface 524 may include, e.g., but may not be limited to, a modem, a network interface (such as, e.g., an Ethernet card), a communications port, a Personal Computer Memory Card International Association (PCMCIA) slot and card or PC Card, etc. Software and data transferred via communications interface 524 may be in the form of signals 528 which may be electronic, electromagnetic, optical or other signals capable of being received by communications interface 524. These signals 528 may be provided to communications interface 524 via, e.g., but not limited to, a communications path 526 (e.g., but not limited to a channel). This channel 526 may carry signals 528, which may include, e.g., but not limited to, propagated signals, and may be implemented using, e.g., but not limited to, wire or cable, fiber optics, a telephone line, a cellular link, an radio frequency (RF) link and other communications channels, etc.

In this document, the terms "computer program medium" and "computer readable medium" may be used to generally refer to media such as, e.g., but not limited to removable storage drive 514, a hard disk installed in hard disk drive 512, etc. These computer program products may provide software to computer system 500. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include, e.g., but not limited to, read only memory (ROM); random access memory (RAM); magnetic disk storage media; optical storage media; flash memory devices; optical; magneto-optical; solid-state; and others.

Computer programs (also called computer control logic), may include object oriented computer programs, and may be stored in main memory 508 and/or the secondary memory 510 and/or removable storage units 514, also called computer program products. Such computer programs, when executed, may enable the computer system 500 to perform the features of the present invention as discussed herein. In particular, the computer programs, when executed, may enable the processor 504 to provide a method to resolve conflicts during data synchronization according to an exemplary embodiment of the present invention. Accordingly, such computer programs may represent controllers of the computer system 500.

In another exemplary embodiment, the invention may be directed to a computer program product comprising a computer readable medium having control logic (computer software) stored therein. The control logic, when executed by the processor 504, may cause the processor 504 to perform the functions of the invention as described herein. In another exemplary embodiment where the invention may be implemented using software, the software may be stored in a computer program product and loaded into computer system 500 using, e.g., but not limited to, removable storage drive 514, hard drive 512 or communications interface 524, etc. The control logic (software), when executed by the processor 504, may cause the processor 504 to perform the functions of the invention as described herein. The computer software may run as a standalone software application program running atop an operating system, or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

An Example Telecommunications Environment

The present invention is described in terms of an example environment. The example environment may include a multiple carriers telecommunications environment. In an exemplary embodiment, the carriers may use any of a range of well known circuit switched and packet switched technologies, as well as telephony, video, audio, broadcast, and/or other data. The multiple telecommunications carriers may include US domestic entities (see Definitions below in Table 4) such as, e.g., ILECs, CLECs, IXCs, NGTs and Enhanced Service Providers (ESPs), as well as global entities such as PTTs and NEs, recognized by those skilled in the art. In addition, as used herein a telecommunications system may include domestic systems used by entities such as, e.g., ILECs, CLECs, IXCs and Enhanced Service Providers (ESPs), as well as global systems recognized by those skilled in the art. Routing of traffic may need to be optimized for setting up calls through any and all of these entities' networks, and networks, according to an exemplary embodiment.

The communications systems according to exemplary embodiments of the present invention may also include wireless communication systems as well as wired line communications. The present invention may also be used in packetized and voice over Internet Protocol (VoIP) communications environments. Wireless callers may use their devices anywhere that the device is located, which has antennae and protocol capabilities compatible with the device. For example, a GSM mobile device, may be used in the US, or in Europe, depending on where the user is located. If the caller is usually in Washington, D.C., USA, and is traveling in Europe and attempts to call another person from Washington, D.C., USA, the routing system should figure out that this is not a local call between two DC callers, but rather an international call from Europe to US. If routing is performed only taking into account calling and called numbers, this may not correctly determine the jurisdiction of the call as international, where both parties are in the same, e.g., area code, in this case, it must be determined that the call is over European facilities, thus this may be determined using additional information, such as the originating switch or router in Europe through which the call is being transported, according to an exemplary embodiment. Similarly in the case of a VoIP call where a user is using, e.g., but not limited to, Skype to place a call from the caller's laptop, while in a hotel, while traveling, again, this attempted call, may be routed properly and to ensure a least cost route, the true location of the mobile party must be discerned in order to achieve the least cost or optimal route, according to an exemplary embodiment. Routing so as to optimize the jurisdiction of the call may ensure an optimal route is chosen for setting up the call, session, or voice chat, etc.

In an exemplary embodiment, many of these entities may issue invoices to their end customers. In addition, many of these entities may also issue invoices related to intercarrier charges to one another. Exemplary, but not limiting telecommunications charges, which may include, e.g., intercarrier charges may include, e.g., but without limitation, in exemplary embodiments, call detail records (CDRs), facility cost records (FCRs), voice over Internet Protocol (VoIP) records, packet records, wireless, content, ringtone, audio, video, broadcast, and other usage, facility and other charges.

In an exemplary embodiment, call usage call detail records (CDRs) may include usage information such as, e.g., but not limited to, billing access number, the phone number, call duration, etc., and/or other invoice data records, for calls purchased at wholesale, may be sent from an IXC to a LEC in, e.g., but not limited to a data format such as, e.g., but not limited to, an EDI 811 format. Similarly, other types of data records may be sent from a carrier to the LEC for processing/billing, including, e.g., broadband access, data access, VoIP, wireless download, music, ringtones, audio, video, alerts, broadcasts, packets, content, etc.

In another exemplary embodiment, facilities may be provided from an IXC or one LEC to another LEC. Such records might include, e.g., but not limited to, mileage characteristics, rate charges, throughput characteristics, etc. and might be for a T1, a T3, an OC3, a point-to-point circuit, etc.

In the exemplary embodiment, data and voice traffic may be transported over a heterogeneous network including telecommunications equipment and facilities of any of a number of the carriers or entities' facilities.

Although the invention is described in terms of this example environment, it is important to note that description in these terms is provided for purposes of illustration only. It is not intended that the invention be limited to this example environment or to the precise inter-operations between the above-noted entities and devices. In fact, after reading the following description, it will become apparent to a person skilled in the relevant art how to implement the invention in alternative environments.

DEFINITIONS

Table 4 below defines exemplary common telecommunications terminology. These terms are used throughout the remainder of the description of the invention.

TABLE 4

| Term | Definition |
| --- | --- |
| access tandem (AT) | An AT is a class ¾ switch may be used to switch calls between EOs in a LATA. An AT may provide subscribers access to the IXCs, to provide long distance calling services. An access tandem may be a network node. Other network nodes can include, for example, but not limited to, a CLEC, or other enhanced services provider (ESP), an international gateway or global point-of-presence (GPOP), or an intelligent peripheral (IP). |
| bearer (B) channels | Bearer (B) channels are digital channels may be used to carry both digital voice and digital data information. An ISDN bearer channel is 64,000 bits per second, which can carry PCM-digitized voice or data. |
| called party | The called party is the caller receiving a call sent over a network at the destination or termination end. |
| calling party | The calling party is the caller placing a call over any kind of network from the origination end. |
| central office (CO) | A CO is a facility that houses an EO homed. EOs are often called COs. |
| class 1 switch | A class 1 switching office, the Regional Center (RC), is the highest level of local and long distance switching, or "office of last resort" to complete a call. |
| class 3 switch | A class 3 switching office was a Primary Center (PC); an access tandem (AT) has class 3 functionality. |
| class 4 switch | A class 4 switching office was a Toll Center (TC) if operators is present or else a Toll Point (TP); an access tandem (AT) has class 4 functionality. |
| class 5 switch | A class 5 switching office is an end office (EO) or the lowest level of local and long distance switching, a local central office. The switch closest to the end subscriber. |
| competitive LEC (CLEC) | CLECs are telecommunications services providers of local services that can compete with ILECs. Level 3 Communications is an example. A CLEC may or may not handle IXC services as well. |
| competitive access providers (CAPS) | Teligent and Winstar were examples. |
| customer premises equipment (CPE) | CPE refers to devices residing on the premises of a customer and used to connect to a telephone network, including ordinary telephones, key telephone systems, PBXs, video conferencing devices and modems. |
| digitized data (or digital data) | Digitized data refers to analog data that has been sampled into a binary representation (i.e., including sequences of 0's and 1's). Digitized data is less susceptible to noise and attenuation distortions because it is more easily regenerated to reconstruct the original signal. |
| egress end office | The egress EO is the node or destination EO with a direct connection to the called party, the termination point. The called party is "homed" to the egress EO. |
| egress | Egress refers to the connection from a called party or termination at the destination end of a network, to the serving wire center (SWC). |
| end office (EO) | An EO is a class 5 switch used to switch local calls within a LATA. Subscribers of the LEC are connected ("homed") to EOs, meaning that EOs are the last switches to which the subscribers are connected. |
| Enhanced Service Provider (ESP) | A network services provider. |
| equal access | 1 + dialing as used in US domestic calling for access to any long distance carrier as required under the terms of the modified final judgment (MFJ) requiring divestiture of the Regional Bell Operating Companies (RBOCs) from their parent company, AT&T. |
| global point of presence (GPOP) | A GPOP refers to the location where international telecommunications facilities and domestic facilities interface, an international gateway POP. |

TABLE 4-continued

| Term | Definition |
| --- | --- |
| incumbent LEC (ILEC) | ILECs are traditional LECs in the US, which are the Regional Bell Operating Companies (RBOCs). Bell South and US West are examples. ILEC can also stand for an independent LEC such as a GTE. |
| ingress end office | The ingress EO is the node or serving wire center (SVC) with a direct connection to the calling party, the origination point. The calling party is "homed" to the ingress EO. |
| ingress | Ingress refers to the connection from a calling party or origination. |
| integrated service digital network (ISDN) basic rate interface (BRI) line | An ISDN Basic Rate Interface (BRI) line provides 2 bearer B channels and 1 data D line (known as "2B + D" over one or two pairs) to a subscriber. |
| integrated services digital network (ISDN) | ISDN is a network that provides a standard for communications (voice, data and signaling), end-to-end digital transmission circuits, out-of-band signaling, and a features significant amount of bandwidth. |
| inter machine trunk (IMT) | An inter-machine trunk (IMT) is a circuit between two commonly-connected switches. |
| inter-exchange carrier (IXC) | IXCs are US domestic long distance telecommunications services providers. AT&T, MCI, Sprint, are examples. |
| internet protocol (IP) | IP is part of the TCP/IP protocols. It is used to recognize incoming messages, route outgoing messages, and keep track of Internet node addresses (using a number to specify a TCP/IP host on the Internet). IP corresponds to the network layer of OSI. |
| Internet service provider (ISP) | An ISP is a company that provides Internet access to subscribers. |
| ISDN primary rate interface (PRI) | An ISDN Primary Rate Interface (PRI) line provides the ISDN equivalent of a T1 circuit. The PRI delivered to a customer's premises can provide 23B + D (in North America) or 30B + D (in Europe) channels running at 1.544 megabits per second and 2.048 megabits per second, respectively. |
| local exchange carrier (LEC) | LECs are local telecommunications services providers. Bell Atlantic and US West are examples. |
| local access and transport area (LATA) | A LATA is a region in which a LEC offers services. There are over 160 LATAs of these local geographical areas within the United States. |
| local area network (LAN) | A LAN is a communications network providing connections between computers and peripheral devices (e.g., printers and modems) over a relatively short distance (e.g., within a building) under standardized control. |
| modified final judgment (MFJ) | Modified final judgment (MFJ) was the decision requiring divestiture of the Regional Bell Operating Companies (RBOCs) from their parent company, AT&T. |
| network node | A network node is a generic term for the resources in a telecommunications network, including switches, DACS, regenerators, etc. Network nodes essentially include all non-circuit (transport) devices. Other network nodes can include, for example, equipment of a CLEC, or other enhanced service provider (ESP), a point-of-presence (POP), an international gateway or global point-of-presence (GPOP). |
| new entrant (NE) | A new generation global telecommunications. |
| next generation telephone (NGT) | A new telecommunications services provider, especially IP telephony providers. Examples are Level 3 and Qwest. |
| packetized voice or voice over a backbone | One example of packetized voice is voice over internet protocol (VOIP). Voice over packet refers to the carrying of telephony or voice traffic over a data network, e.g. voice over frame, voice over ATM, voice over Internet Protocol (IP), over virtual private networks (VPNs), voice over a backbone, etc. |
| Pipe or dedicated communications facility | A pipe or dedicated communications facility connects an ISP to the internet. |
| point of presence (POP) | A POP refers to the location within a LATA where the IXC and LEC facilities interface. |
| point-to-point tunneling protocol (PPTP) | A virtual private networking protocol, point-to-point tunneling protocol (PPTP), can be used to create a "tunnel" between a remote user and a data network. A tunnel permits a network administrator to extend a virtual private network (VPN) from a server (e.g., a Windows NT server) to a data network (e.g., the Internet). |
| point-to-point (PPP) protocol | PPP is a protocol permitting a computer to establish a connection with the Internet using a modem. PPP supports high-quality graphical front ends, like Netscape. |
| postal telephone telegraph (PTT) | State regulated telephone companies, many of which are being deregulated. NTT is an example. |
| private branch exchange (PBX) | A PBX is a private switch located on the premises of a user. The user is typically a private company which desires to provide switching locally. |
| private line with a dial tone | A private line is a direct channel specifically dedicated to a customer's use between two specified points. A private line with a dial tone can connect a PBX or an ISP's access concentrator to an end office (e.g. a channelized T1 or PRI). A private line can also be known as a leased facility. |

TABLE 4-continued

| Term | Definition |
|---|---|
| public switched telephone network (PSTN) | The PSTN is the worldwide switched voice network. |
| regional Bell operating companies (RBOCs) | RBOCs are the Bell operating companies providing LEC services after being divested from AT&T. |
| signaling system 7 (SS7) | SS7 is a type of common channel interoffice signaling (CCIS) used widely throughout the world. The SS7 network provides the signaling functions of indicating the arrival of calls, transmitting routing and destination signals, and monitoring line and circuit status. |
| switching hierarchy or office classification | An office class is a functional ranking of a telephone central office switch depending on transmission requirements and hierarchical relationship to other switching centers. Prior to AT&T's divestiture of the RBOCs, an office classification was the number assigned to offices according to their hierarchical function in the U.S. public switched network (PSTN). The following class numbers are used: class 1 = Regional Center (RC), class 2 = Sectional Center (SC), class 3 = Primary Center (PC), class 4 = Toll Center (TC) if operators are present or else Toll Point (TP), class 5 = End Office (EO) a local central office. Any one center handles traffic from one to two or more centers lower in the hierarchy. Since divestiture and with more intelligent software in switching offices, these designations have become less firm. The class 5 switch was the closest to the end subscriber. Technology has distributed technology closer to the end user, diffusing traditional definitions of network switching hierarchies and the class of switches. |
| telecommunications carrier | A LEC, a CLEC, an IXC, an Enhanced Service Provider (ESP), an intelligent peripheral (IP), an international/global point-of-presence (GPOP), i.e., any provider of telecommunications services. |
| transmission control protocol (TCP) | TCP is an end-to-end protocol that operates at the transport and sessions layers of OSI, providing delivery of data bytes between processes running in host computers via separation and sequencing of IP packets. |
| transmission control protocol/internet protocol (TCP/IP) | TCP/IP is a protocol that provides communications between interconnected networks. The TCP/IP protocol is widely used on the Internet, which is a network comprising several large networks connected by high-speed connections. |
| trunk | A trunk connects an access tandem (AT) to an end office (EO). |
| wide area network (WAN) | A WAN is a data network that extends a LAN over the circuits of a telecommunications carrier. The carrier is typically a common carrier. A bridging switch or a router is used to connect the LAN to the WAN. |

INTRODUCTION

Exemplary Telecommunications Network
Exemplary Voice Network
Exemplary Simple Voice Network FIG. 11 is a block diagram providing an overview of a standard telecommunications network 100 providing local exchange carrier (LEC) services within one or more local access and transport areas (LATAs). Telecommunications network 1100 can provide a switched voice connection from a calling party 1102 to a called party 1110. FIG. 1 is shown to also include a private branch exchange 1112 which can provide multiple users access to LEC services by, e.g., but not limited to, a private line, and/or facilities. Calling party 1102 and called party 1110 can be ordinary telephone equipment, key telephone systems, a private branch exchange (PBX) 1112, or applications running on a host computer. Network 1100 can be used for modem access as a data connection from calling party 1102 to, for example, an Internet service provider (ISP) (not shown). Network 1100 can also be used for access to, e.g., but not limited to, a private data network. For example, calling party 1102 can be an employee working on a notebook computer at a remote location who is accessing his employer's private data network through, for example, a dial-up modem connection.

FIG. 11 includes end offices (EOs) 1104 and 1108. EO 1104 is called an ingress EO because it provides a connection from calling party 1102 to public switched telephone network (PSTN) facilities. EO 1108 is called an egress EO because it provides a connection from the PSTN facilities to a called party 1110. In addition to ingress EO 1104 and egress EO 1108, the PSTN facilities associated with telecommunications network 1100 include an access tandem (AT) (not shown) at points of presence (POPs) 1132 and 1134 that can provide access to, e.g., one or more interexchange carriers (IXCs) 1106 for long distance traffic, see FIG. 12. Alternatively, it would be apparent to a person having ordinary skill in the art that IXC 1106 could also be, for example, a CLEC, or other enhanced service provider (ESP), an international gateway or global point-of-presence (GPOP), or an intelligent peripheral (IP).

FIG. 11 also includes a private branch exchange (PBX) 1112 coupled to EO 104. PBX 1112 couples calling parties 1124 and 1126, fax 1116, client computer 1118 and associated modem 1130, and local area network 1128 having client computer 1120 and server computer 1122 coupled via an associated modem 1130. PBX 1112 is a specific example of a general class of telecommunications devices located at a subscriber site, commonly referred to as customer premises equipment (CPE).

Network 1100 also includes a common channel interactive signaling (CCIS) network for call setup and call tear down. Specifically, FIG. 11 includes a Signaling System 7 (SS7) signaling network 1114.

Exemplary Detailed Voice Network

FIG. 12 is a block diagram illustrating an overview of a standard telecommunications network 1200, providing both LEC and IXC carrier services between subscribers located in different LATAs. Telecommunications network 1200 is a more detailed version of telecommunications network 1100. Calling party 1102*a* and called party 1110*a* are coupled to EO switches 1104*a* and 1108*a*, respectively. In other words, calling party 1102*a* is homed to ingress EO 1104*a* in a first LATA, whereas called party 1110*a* is homed to an egress EO 1108*a* in a second LATA. Calls between subscribers in different LATAs are long distance calls that are typically routed to IXCs. Sample IXCs in the United States include AT&T, MCI and Sprint.

Telecommunications network 1200 includes access tandems (AT) 1206 and 1208. AT 1206 provides connection to points of presence (POPs) 1132*a*, 1132*b*, 1132*c* and 1132*d*. IXCs 1106*a*, 1106*b* and 1106*c* provide connection between POPs 1132*a*, 1132*b* and 1132*c* (in the first LATA) and POPs 1134*a*, 1134*b* and 1134*c* (in the second LATA). Competitive local exchange carrier (CLEC) 1214 provides an alternative connection between POP 1132*d* and POP 1134*d*. POPs 1134*a*, 1134*b*, 1134*c* and 1134*d*, in turn, are connected to AT 1208, which provides connection to egress EO 1108*a*. Called party 1110*a* can receive calls from EO 1108*a*, which is its homed EO.

Alternatively, it would be apparent to a person having ordinary skill in the art that an AT 1206 can also be, for example, a CLEC, or other enhanced service provider (ESP), an international gateway or global point-of-presence (GPOP), or an intelligent peripheral.

Network 1200 also includes calling party 1102*c* homed to CLEC switch 1104*c*. Following the 1996 Telecommunications Act in the U.S., CLECs gained permission to compete for access within the local RBOCs territory. RBOCs are commonly referred to as incumbent local exchange carriers (ILECs).

Network 1200 further may include a fixed wireless CLEC 1209. Fixed wireless CLEC 1209 includes a wireless transceiver/receiver radio frequency (RF) tower 1210 in communication over an RF link to a subscriber transceiver RF tower 1212. Subscriber RF tower 1212 is depicted coupled to a CPE box, PBX 1112*b*. PBX 1112*b* couples calling parties 1124*b* and 1126*b*, fax 1116*b*, client computer 1118*b* and associated modem 1130*b*, and local area network 1128*b* having client computer 1120*b* and server computer 1122*b* coupled via an associated modem 1130*b*.

Network 1200 also includes called party 1110*a*, a fax 1116*a*, client computer 1118*a* and associated modem 1130*a*, and cellular communications RF tower 1202 and associated cellular subscriber called party 1204, all coupled to EO 1108*a*, as shown.

EO 1104*a*, 1108*a* and AT 1206, 1208 are part of a switching hierarchy. EO 1104*a* is known as a class 5 office and AT 1208 is a class 3/4 office switch. Prior to the divestiture of the regional Bell Operating Companies (RBOCs) from AT&T following the modified final judgment, an office classification was the number assigned to offices according to their hierarchical function in the U.S. public switched network (PSTN). An office class is a functional ranking of a telephone central office switch depending on transmission requirements and hierarchical relationship to other switching centers. A class 1 office was known as a Regional Center (RC), the highest level office, or the "office of last resort" to complete a call. A class 2 office was known as a Sectional Center (SC). A class 3 office was known as a Primary Center (PC). A class 4 office was known as either a Toll Center (TC) if operators were present, or otherwise as a Toll Point (TP). A class 5 office was an End Office (EO), i.e., a local central office, the lowest level for local and long distance switching, and was the closest to the end subscriber. Any one center handles traffic from one or more centers lower in the hierarchy. Since divestiture and with more intelligent software in switching offices, these designations have become less firm. Technology has distributed functionality closer to the end user, diffusing traditional definitions of network hierarchies and the class of switches.

Exemplary arrows are depicted illustrating exemplary invoice charges that may flow between different exemplary entities. For example, but not limited to, exemplary telecommunications charges, which may include, e.g., intercarrier charges may include, e.g., but without limitation, in exemplary embodiments, call detail records (CDRs), facility cost records (FCRs), voice over Internet Protocol (VoIP) records, packet records, wireless, content, ringtone, audio, video, broadcast, and other usage, facility and other charges. Charges on invoices may relate, e.g., but not limited to, to carriers charges, Internet service provider (ISP) charges, VoIP charges, wireless charges, content provider charges, music company charges, video company charges, broadcast content charges, alert charges, packet charges, and any other fixed and/or variable fee charges which may be included in an invoice.

Connectivity to Internet Service Providers (ISPs)

In addition to providing a voice connection from calling party 1102*a* to called party 1110*a*, the PSTN can provide calling party 1102*a* a data connection to an ISP (i.e. similar to client 1118*b*).

Network 1200 can also include an Internet service provider (ISP) (not shown) which could include a server computer 1122 coupled to a data network 1142 as will be discussed further below with reference to FIG. 13. The Internet is a well-known, worldwide network comprising several large networks connected together by data links. These links can include, for example, Integrated Digital Services Network (ISDN), T1, T3, FDDI and SONET links. Alternatively, an internet can be a private network interconnecting a plurality of LANs and/or WANs, such as, for example, an intranet. An ISP can provide Internet access services for subscribers such as client 1118*b*.

To establish a connection with an ISP, client 1118*b* can use a host computer connected to a modem (modulator/demodulator) 1130*b*. The modem can modulate data from the host computer into a form (traditionally an analog form) for transmission to the LEC facilities. Typically, the LEC facilities convert the incoming analog signal into a digital form. In one embodiment, the data is converted into the point-to-point protocol (PPP) format. (PPP is a well-known protocol that permits a computer to establish a connection with the Internet using a standard modem. It supports high-quality, graphical user-interfaces.) As those skilled in the art will recognize, other formats are available, including, e.g., a transmission control program, internet protocol (TCP/IP) packet format, a user datagram protocol, internet protocol (UDP/IP) packet format, an asynchronous transfer mode (ATM) cell packet format, a serial line interface protocol (SLIP) protocol format, a point-to-point (PPP) protocol format, a point-to-point tunneling protocol (PPTP) format, a NETBIOS extended user interface (NETBEUI) protocol format, an Appletalk protocol format, a DECnet, BANYAN/VINES, an internet packet exchange (IPX) protocol format, and an internet control message protocol (ICMP) protocol format.

Although perhaps not shown, the exemplary embodiments of the present invention are equally applicable to any of, e.g., but not limited to, circuit switched, packet switched, wired line, wireless, cable TV (CATV), voice over power line, etc. networks, whether voice based, cell based, analog, digital, personal area, local area, and/or wide area networks, music, video, audio, movie, broadcast, digital and analog contents.

Exemplary Communications Links

Note that FIGS. 11,12 and other figures described herein include lines which may refer to communications lines or which may refer to logical connections between network nodes, or systems, which are physically implemented by telecommunications carrier devices. These carrier devices include circuits and network nodes between the circuits including, for example, digital access and cross-connect system (DACS), regenerators, tandems, copper wires, and fiber optic cable. It would be apparent to persons having ordinary skill in the art that alternative communications lines can be used to connect one or more telecommunications systems devices. Also, a telecommunications carrier as defined here, can include, for example, a LEC, a CLEC, an IXC, an Enhanced Service Provider (ESP), a global or international services provider such as a global point-of-presence (GPOP), and an intelligent peripheral.

EO 1104a and AT 1206 are connected by a trunk. A trunk connects an AT to an EO. A trunk can be called an inter machine trunk (IMT). AT 1208 and EO 1108a are connected by a trunk which can be an IMT.

Referring to FIG. 11, EO 1104 and PBX 1112 can be connected by a private line with a dial tone. A private line can also connect an ISP (not shown) to EO 104, for example. A private line with a dial tone can be connected to a modem bay or access converter equipment at the ISP. Examples of a private line are a channelized T1 or integrated services digital network (ISDN) primary rate interface (PRI). An ISP can also attach to the Internet by means of a pipe or dedicated communications facility. A pipe can be a dedicated communications facility. A private line can handle data modem traffic to and from an ISP.

Trunks can handle switched voice traffic and data traffic. For example, trunks can include digital signals DS1-DS4 transmitted over T1-T4 carriers. Table 5 provides typical carriers, along with their respective digital signals, number of channels, and bandwidth capacities.

TABLE 5

| Digital signal | Number of channels | Designation of carrier | Bandwidth in Megabits per second (Mbps) |
| --- | --- | --- | --- |
| DS0 | 1 | None | 0.064 |
| DS1 | 24 | T1 | 1.544 |
| DS2 | 96 | T2 | 6.312 |
| DS3 | 672 | T3 | 44.736 |
| DS4 | 4032 | T4 | 274.176 |

Alternatively, trunks can include optical carriers (OCs), such as OC-1, OC-3, etc. Table 6 provides typical optical carriers, along with their respective synchronous transport signals (STSs), ITU designations, and bandwidth capacities.

TABLE 6

| Optical carrier (OC) signal | Electrical signal, or synchronous transport signal (STS) | International Telecommunications Union (ITU) terminology | Bandwidth in Megabits per second (Mbps) |
| --- | --- | --- | --- |
| OC-1 | STS-1 | | 51.84 |
| OC-3 | STS-3 | STM-1 | 155.52 |
| OC-9 | STS-9 | STM-3 | 466.56 |
| OC-12 | STS-12 | STM-4 | 622.08 |
| OC-18 | STS-18 | STM-6 | 933.12 |
| OC-24 | STS-24 | STM-8 | 1244.16 |
| OC-36 | STS-36 | STM-12 | 1866.24 |
| OC-48 | STS-48 | STM-16 | 2488.32 |

As noted, a private line is a connection that can carry data modem traffic. A private line can be a direct channel specifically dedicated to a customer's use between two specified points. A private line can also be known as a leased line. In one embodiment, a private line is an ISDN/primary rate interface (ISDN PRI) connection. An ISDN PRI connection can include a single signal channel (called a data or D channel) on a T1, with the remaining 23 channels being used as bearer or B channels. (Bearer channels are digital channels that bear voice and data information.) If multiple ISDN PRI lines are used, the signaling for all of the lines can be carried over a single D channel, freeing up the remaining lines to carry only bearer channels.

Exemplary Telecommunications Traffic

Telecommunications traffic can be sent and received from any network node of a telecommunications carrier. A telecommunications carrier can include, for example, a LEC, a CLEC, an IXC, and an Enhanced Service Provider (ESP). In an embodiment, this traffic can be received from a network node which is, for example, a class 5 switch, such as EO 1104a, or from a class 3/4 switch, such as AT 1206. Alternatively, the network system can also be, for example, a CLEC, or other enhanced service provider (ESP), an international gateway or global point-of-presence (GPOP), or an intelligent peripheral.

Voice traffic refers, for example, to a switched voice connection between calling party 1102a and called party 1110a. It is important to note that this is on a point-to-point dedicated path, i.e., that bandwidth is allocated whether it is being used or not. A switched voice connection is established between calling party 1102a and EO 1104a, then to AT 1206 then over an IXC's network such as that of IXC 1106a to AT 1208 and then to EO 1108a and over a trunk to called party 1110a. In another embodiment, AT 1206 or IXC 1106a can also be, for example, a CLEC, or other enhanced service provider (ESP), an international gateway or global point-of-presence (GPOP), or an intelligent peripheral.

It is possible that calling party 1102a is a computer with a data connection to a server over the voice network. Data traffic refers, for example, to a data connection between a calling party 1102a (using a modem) and a server 1122b that could be part of an ISP. A data connection can be established, e.g., between calling party 1102a and EO 1104a, then to AT 1206, then to CLEC 1214, then over a fixed wireless CLEC 1209 link to PBX 1112b to a modem 1130b associated with server 1122b.

A voice-over-Internet Protocol (VoIP) call may also be made and telephony and other data may be delivered over a data network as shown in FIG. 13.

Exemplary SS7 Signaled Call Flow

To initiate a call in an SS7 telecommunications network, a calling party using a telephone connected to an ingress EO switch, dials a telephone number of a called party. The telephone number is passed from the telephone to the SSP at the ingress EO of the calling party's local exchange carrier (LEC). First, the SSP can process triggers and internal route rules based on satisfaction of certain criteria. Second, the SSP can initiate further signaling messages to another EO or access tandem (AT), if necessary. The signaling information can be passed from the SSP to STPs, which route the signals between the ingress EO and the terminating end office, or egress EO. The egress EO has a port designated by the telephone number of the called party. The call is set up as a direct connection between the EOs through tandem switches if no direct trunking exists or if direct trunking is full. If the call is a long distance call, i.e., between a calling party and a called party located in different local access transport areas (LATAs), then the call is connected through an inter exchange carrier (IXC) switch. Such a long distance call is commonly referred to as an inter-LATA call. LECs and IXCs are collectively referred to as the public switched telephone network (PSTN).

According to an exemplary embodiment, the HDR, by rough category, may include, e.g., but not limited to:

General IP information
  a. SOURCE_IP_ADDRESS
  b. SOURCE_PORT
  c. DESTINATION_IP_ADDRESS
  d. DESTINATION_PORT
  e. PROTOCOL
  f. REQUEST_BYTES
  g. RESPONSE_BYTES
Date/Time
  a. START_DATE
  b. START_TIME
  c. END_DATE
  d. END_TIME
  e. DURATION_MSEC
Request Information
  a. URI
  b. URI_PATH
  c. QUERY_TEXT
  d. USER_AGENT
  e. REQUEST_INDEX
  f. REFERRER_PATH
  g. REFERRER_SERVER
Response information
  a. STATUS_CODE
  b. CONTENT_LENGTH
  c. CONTENT_SIGNATURE
  d. MIME_SUBTYPE
  e. MIME_TYPE
  f. NAME
  g. SERVER
  h. SERVER_AGENT
Other
  a. HOST_IP_ADDRESS
  b. HOST_NAME
  c. SUBSCRIBER_ID
  d. DIRECTION
  e. CONTENT_CATEGORY
  f. FINAL
Exemplary Embodiments
Distributed Collection
  a. Receiving data from network probe(s)
  b. Enriching the probe data
  c. Creation of preliminary HDRs from the enriched probe data
Transmission of preliminary HDRs
  a. Sending the preliminary HDRs to centralized location (compression, encryption)
  b. Receiving preliminary HDRs from distributed collection (decryption, decompression)
Centralized Processing (this and below portions, may be at the same or a different location than above)
  a. Enriching the preliminary HDRs
  b. Aggregating the enriched CDRs
  c. Final HDR generation from the Enriched/Aggregated preliminary HDRs
Storage—on e.g., data warehouse appliance, e.g., persistent storage
  a. Persistent storage of final HDRs for a period of time
Access—e.g., query/result
  a. Methods
    i. Generates Extracts of Data
    ii. Canned reports
    iii. Ad-hoc user interactive reporting
  b. Purpose
    i. creating at least one actionable result based on said at least one HDR,
    wherein said at least one actionable result comprises at least one of:
      1. providing detailed usage statistics or results, by subscriber, comprising at least one of:
      2. websites accessed, or
      3. HTTP requests opened; or
      4. providing backup detail for data access network resources comprising at least one of:
        for billing for consumption or nonconsumption billing utilization;
        for use in retail applications;
        for use in nonretail applications;
        for use in wholesale applications;
        for use in Internet Service Provider (ISP) usage tracking;
        for mobile phone usage statistics tracking;
        for mobile device usage statistics tracking; or
        for independent verification of third party roaming volume.

According to an exemplary embodiment, a computer processor-implemented method of generating a header detail record (HDR) for a data browsing user accessing network resources, comprising at least one of:

a. collecting of network data from at least one probe on at least one distributed processing collection node; and b. transmitting at least one preliminary HDR from the at least one distributed processing collection node to the centralized processing node for further processing;

c. receiving and/or processing the at least one preliminary HDR by the centralized processing node to create a final HDR record;

d. providing persistent storage of HDR records; and/or e. providing access to the final HDRs for exemplary specific purposes.

An exemplary embodiment may include a computer processor-implemented method of generating a header detail record (HDR) for a data browsing user accessing network resources, comprising:

a. Collection of network data from at least one probe on at least one distributed processing node;

b. Transmission of preliminary HDRs from the collection node to the centralized processing node;

c. Processing of the preliminary HDRs by the centralized processing node to create a final HDR record;

d. Persistent storage of HDR records; and/or e. Provision for access to the final HDRs for specific purposes.

According to another exemplary embodiment, one or more probes may capture packets, may analyze contents of packet headers, and may capture certain fields and generate an initial HDR record, then the HDR may be transmitted, which may include compression and/or encryption, the prior exemplary steps may be performed at a distributed location. According to an exemplary embodiment, a location may receive the transmission and may enrich the HDR data by, e.g., but not limited to, adding subscriber data, a host name, categorization, etc. According to an exemplary embodiment, the enriched data may then be aggregated, and finally, may be analyzed using various analytic tools.

According to an exemplary embodiment, an embodiment may include:

1) Virtually all probe vendors can capture and forward Header/DNS/Search Records. Some probes can be able to give more interesting data. Data may include data where the system may be configured to extract Header/DNS/Search (HDR raw) records and pushing them to us since this does not require anything "special."

2) "Compression"—is where the raw HDR records received at a central location may be "compressed" to create single event records (HDR event). The code to support compressing activity may be distributed on one or more processor(s) as close to the probe as possible. The compression code may be the event workhorse constantly collecting raw HDRs from the probe, compressing them into event HDR records and transmitting them back to the warehouse every 15 minutes. This device and the code on it needs to be managed centrally which will create some new challenges for us.

As an "edge device" this will require some new thinking on our part to make work. Clearly we will need a small version of Service Assurance (SA) to monitor and control these devices on a large network.

3) Transmission—is where a carrier may transmit the data to a collective aggregator. Carriers can handle transmission, since most carriers are in the business of moving data around. The system may include a landing zone where the files can be placed and accounted for. According to an exemplary embodiment, data files may be optionally encrypted, e.g., prior to transmission and may be decrypted to load on the ping warehouse, in an exemplary embodiment (and may do this generally if the overhead is not excessive). This transmission function may include file management, and/or error management, etc.

4) Loading and Enrichment—is a bulk portion of processing to place data in a position to including enrichments, functionality and performance optimization for this system. With the possibility of having 50 or more edge devices on a large carrier, probes may be deployed at the carrier, to capture and store raw data.

A session may include VoIP, Skype, Video, HTTP, and/or IP Data, etc. Session data may include summarized IPFlow data packet data, digested information, packet data, IP Flow information, digested information from probe, and/or packet data, etc. Distributed probes may receive the session data, and may capture at the remote site for use for, e.g., billing, (end users want more details than an IPDR for billing purposes, listings of types of data elements, billing details, etc.), creating a preliminary HDR, may not be fully formed, may depend on the probe, whether a subset or a complete HDR. Then transmitting may occur. Then receiving at a central host, decompressing data received from an HDR generation component, enrichment, aggregation, and analytics, according to an exemplary embodiment.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents. It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A computer processor-implemented method of generating a header detail record (HDR) for hypertext transport protocol (HTTP) traffic, comprising:
  a. receiving, by at least one computer processor, packet data of the hypertext transport protocol (HTTP) traffic from at least one probe on at least one distributed processing node of a data communications network of a communications services provider, said packet data comprising:
    i. header data, and
    ii. payload data;
  b. analyzing, by the at least one computer processor, said packet data comprising:
    i. extracting, by the at least one computer processor, at least one preliminary header detail record (HDR) from said header data and said payload data for said packet data of the HTTP traffic; and
    ii. determining, by the at least one computer processor, by deep packet inspection the hypertext transport protocol (HTTP) traffic being transported in said at least one preliminary packet;
  c. creating, by the at least one computer processor, said at least one preliminary header detail record (HDR) comprising:
    i. storing, by the at least one computer processor, said at least one preliminary header detail record (HDR) as a header detail record (HDR); and
  d. organizing, by the at least one computer processor, all of said at least one header detail records (HDRs) from said packet data according to an associated subscriber of a plurality of subscribers of the communications services provider, comprising:
    i. associating, by the at least one computer processor, said at least one header detail record (HDR) with the associated subscriber of the plurality of subscribers of the communications services provider to obtain an associated at least one header detail record (HDR); and
    ii. wherein the subscriber of the plurality of subscribers of the communications services provider has a plurality of physical devices, each of said plurality of physical devices having an Internet Protocol (IP) address associated with said each of said plurality of devices of the subscriber, and associating with the subscriber of the plurality of subscribers of the communications services provider, said at least one header detail record (HDR) of said each of said plurality of physical devices and said Internet Protocol (IP) addresses of the subscriber;
  e. aggregating, by the at least one computer processor, a plurality of said associated of said at least one header detail records (HDRs) associated with a given associated subscriber of the plurality of subscribers of the communications services provider to obtain at least one aggregated header detail records (HDRs); and f. compressing, by the at least one computer processor, said at least one aggregated header detail records (HDRs) to obtain at least one compressed and aggregated HDR; and g. transmitting, by the at least one computer processor, said at least one compressed and aggregated header detail record (HDR); and h. creating, by at least one computer processor, at least one actionable result based on said at least one transmitted, compressed and aggregated header detail record (HDRs).

2. The method according to claim 1, wherein said at least one probe is compliant with a standard protocol comprising at least one of:
a. sflow; or
b. netflow.

3. The method according to claim 1, wherein said header data comprises at least one of:
a. originating address of a packet of said packet data;
b. destination address of a packet of said packet data;
c. a source of a packet of said packet data;
d. a destination of a packet of said packet data; or
e. a size of a packet of said packet data.

4. The method according to claim 1, further comprising enriching, by the computer processor, said packet data, said enriching comprising at least one of:
a. determining by domain name service (DNS) lookup, a destination site being accessed by the subscriber of the plurality of subscribers of the communications services provider, using one of said plurality of physical devices.

5. The method according to claim 1, wherein said determining by deep packet inspection comprises at least one of:
a. mediating data;
b. reducing data to a cube;
c. compressing data for transmission;
d. drilling down into encapsulated packet data;
e. analyzing proxied packets to determine source of said packet;
f. determining a flow associated with said packet;
g. determining a subscriber associated with said packet; or
h. determining a session associated with said packet.

6. The method according to claim 1, wherein said (b) (ii) determining by deep packet inspection comprises:
determining a session associated with said packet comprising identifying with regards to said session at least one of:
a. a customer identifier (ID) of said session;
b. a destination of said session;
c. a requester of said session; or
d. at least one category of said session.

7. The method according to claim 1,
wherein said creating said at least one actionable result based on said at least one aggregated header detail records (HDRs) comprises at least one of:
a. providing detailed usage statistics or results, by subscriber, comprising at least one of:
i. websites accessed, or
ii. HTTP requests opened; or
b. providing backup detail for data access network resources comprising at least one of:
i. for billing for consumption or nonconsumption billing utilization;
ii. for use in retail applications;
iii. for use in nonretail applications;
iv. for use in wholesale applications;
v. for use in Internet Service Provider (ISP) usage tracking;
vi. for mobile phone usage statistics tracking;
vii. for mobile device usage statistics tracking; or
viii. for independent verification of third party roaming volume.

8. The method according to claim 1, wherein said (c) creating further comprises:
ii. transmitting to a header record generator service provider at least one of:
at least one header record;
at least one domain name service (DNS) record;
at least one header detail record (HDR); or
at least one search record.

9. The method according to claim 1, further comprising:
transmitting to a header record generator service provider compressed data comprising at least one of:
at least one header record;
at least one domain name service (DNS) record;
at least one header detail record (HDR); or at least one search record.

10. The method according to claim 1, further comprising: compressing raw data to be transmitted to a service provider.

11. The method according to claim 1, further comprising: managing received compressed data.

12. The method according to claim 11, wherein said managing comprises:
managing centrally said received compressed data.

13. The method according to claim 1, wherein said receiving said packet data comprises receiving a plurality of feeds from a plurality of probes.

14. The method according to claim 1, further comprising: enriching said packet data.

15. The method according to claim 1, further comprising: creating at least one actionable result based on said at least one HDR.

16. The method according to claim 1,
wherein said (g) transmitting comprises:
transmitting said at least one compressed and aggregated HDR to a data warehouse.

17. The method of claim 16, wherein said (g) transmitting comprises:
encrypting said at least one compressed and aggregated HDR prior to said transmitting.

18. The method according to claim 1, wherein said at least one computer processor is at least one of monitored, controlled, or managed centrally.

19. The method according to claim 1, further comprising at least one of:
monitoring;
controlling;
managing;
managing at least one file; or
managing one or more errors.

20. The method according to claim 19, further comprising at least one of:
loading said at least one file;
enriching said received data comprising at least one of:
enriching in a shallow manner comprising at least one of:
looking up a name;
looking up a domain name service (DNS);
using an IP address to determine location;
enriching with a location;
enriching with a site;
enriching with an address;
enriching with an owner;

determining identity of user of IP address;
determining who owns the name;
enriching with a site category;
enriching with a subscriber;
associating a pricing plan;
associating device information;
determining cost information;
determining a device causing a spike in traffic at a given time;
determining a subscriber causing a spike in traffic at a given time;
determining popular sites for a given device;
determining a website attracting most traffic;
identifying subscribers using a social networking site;
categorizing sites and tieing to a subscriber;
determining a percentage of traffic on portal versus off portal;
determining a domain visited consistently by at least a given percentage of users over a given period of time including over a lengthy period of time of up to a year or more;
determining a domain gaining in popularity over a given period of time including up to a month, or more;
determining usage of a given application store over a period of time;
determining a percentage of users accessing a carrier portal;
determining most popular video content providers;
determining most popular audio content providers;
determining most popular gaming portals;
determining most popular digital radio stations;
determining most popular content portals; or
determining carrier costing information to carry at least one of a call, session, or interaction; or
enriching in a deep manner comprising at least one of:
fingerprinting a device;
identifying a device;
determining a type of device;
determining if there are discrepancies with expectations;
identifying content;
identifying audio content;
identifying video content;
identifying application content;
identifying game content;
enriching with compliance;
enriching with determining whether acceptable use;
determining whether there is a digital rights management (DRM) violation;
determining whether someone is transferring an iTunes file from a non-iTunes location;
determining types of content being downloaded;
determining average pages visited per session;
determining support for billing detail;
determining other customer activity when streaming music;
determining correlations between types of usage;
determining correlations between activity and at least one of: online or on session activity;
determining whether at least one of customers, devices or plans, having devices ideal for music streaming, actually use the devices for music streaming;
determining whether TV streamers are also social networkers;
determining correlations between different types of activity;
determining customer segments adopting technologies;
determining customer segments associated with content;
determining demographics of users associated with content;
determining customer segments adopting instant messaging;
determining average number of voice over Internet Protocol (VoIP) sessions per month;
determining correlations between VoIP usage and Skype usage;
determining correlations between VoIP usage and other content;
determining trends based on usage of a given content type;
determining cannibalization of services;
determining how simple message system (SMS) usage changes upon adopting instant messaging (IM);
determining evolution of content usage over time;
determining cannibalization of standard voice usage by VoIP usage;
determining split between at least two of application, browser or widget initiated traffic;
determining product mix;
determining insight from an advertising perspective;
determining subscribers generating advertising revenue;
determining subscribers generating advertising revenue for a given advertiser;
determining proportion of music from on-portal music store;
determining proportion of games downloaded from on-portal application store;
determining proportion of applications downloaded from on-portal application store;
determining proportion of content downloaded from on-portal content store;
determining a given number of popular games off portal downloaded for a given time period;
determining a given proportion of activity at least one of on-portal, or off-portal;
determining proportion of content off portal or on portal downloaded over a given time period;
determining subscribers illegally downloading digital-rights-management (DRM) protected content;
identifying VoIP activity in distributed environment;
determining and storing long term trend data centrally;
or
determining whether someone is transferring an iTunes file from an iTunes location.

21. The method according to claim 1, further comprising:
receiving said at least one compressed and aggregated header detail record (HDR);
decompressing said at least one compressed and aggregated header detail record (HDR); and
enriching said decompressed and aggregated header detail record (HDR) comprising:
enriching in a shallow manner comprising:
looking up a name;
looking up a domain name service (DNS);
using an IP address to determine location;
enriching with a location;

enriching with a site;
enriching with an address;
enriching with an owner;
determining identity of user of IP address;
determining who owns the name;
enriching with a site category;
enriching with a subscriber;
associating a pricing plan;
associating device information;
determining cost information;
determining a device causing a spike in traffic at a given time;
determining a subscriber causing a spike in traffic at a given time;
determining popular sites for a given device;
determining a website attracting most traffic;
identifying subscribers using a social networking site;
categorizing sites and tieing to a subscriber;
determining a percentage of traffic on portal versus off portal;
determining a domain visited consistently by at least a given percentage of users over a given period of time including over a lengthy period of time of up to a year or more;
determining a domain gaining in popularity over a given period of time including up to a month, or more;
determining usage of a given application store over a period of time;
determining a percentage of users accessing a carrier portal;
determining most popular video content providers;
determining most popular audio content providers;
determining most popular gaming portals;
determining most popular digital radio stations;
determining most popular content portals; and
determining carrier costing information to carry at least one of a call, session, or interaction; and
enriching in a deep manner comprising:
fingerprinting a device;
identifying a device;
determining a type of device;
determining if there are discrepancies with expectations;
identifying content;
identifying audio content;
identifying video content;
identifying application content;
identifying game content;
enriching with compliance;
enriching with determining whether acceptable use;
determining whether there is a digital rights management (DRM) violation;
determining whether someone is transferring an iTunes file from a non-iTunes location;
determining types of content being downloaded;
determining average pages visited per session;
determining support for billing detail;
determining other customer activity when streaming music;
determining correlations between types of usage;
determining correlations between activity and at least one of: online or on session activity;
determining whether at least one of customers, devices or plans, having devices ideal for music streaming, actually use the devices for music streaming;
determining whether TV streamers are also social networkers;
determining correlations between different types of activity;
determining customer segments adopting technologies;
determining customer segments associated with content;
determining demographics of users associated with content;
determining customer segments adopting instant messaging;
determining average number of voice over Internet Protocol (VoIP) sessions per month;
determining correlations between VoIP usage and Skype usage;
determining correlations between VoIP usage and other content;
determining trends based on usage of a given content type;
determining cannibalization of services;
determining how simple message system (SMS) usage changes upon adopting instant messaging (IM);
determining evolution of content usage over time;
determining cannibalization of standard voice usage by VoIP usage;
determining split between at least two of application, browser or widget initiated traffic;
determining product mix;
determining insight from an advertising perspective;
determining subscribers generating advertising revenue;
determining subscribers generating advertising revenue for a given advertiser;
determining proportion of music from on-portal music store;
determining proportion of games downloaded from on-portal application store;
determining proportion of applications downloaded from on-portal application store;
determining proportion of content downloaded from on-portal content store;
determining a given number of popular games off portal downloaded for a given time period;
determining a given proportion of activity at least one of on-portal, or off-portal;
determining proportion of content off portal or on portal downloaded over a given time period;
determining subscribers illegally downloading digital-rights-management (DRM) protected content;
identifying VoIP activity in distributed environment;
determining and storing long term trend data centrally;
and
determining whether someone is transferring an iTunes file from an iTunes location.

22. A computer processor-implemented method comprising:
a. receiving, by at least one computer processor, compressed source records;

b. decompressing, by the at least one computer processor, said compressed source records into uncompressed source records;
c. organizing, by the at least one computer processor, said decompressed source records by subscriber of a plurality of subscribers of a communications services provider into subscriber organized source records, wherein the subscriber of the plurality of subscribers of the communications services provider has a plurality of physical devices, each of said plurality of physical devices having an Internet Protocol (IP) address associated with said each of said plurality of devices owned by, or associated with, the subscriber, and associating with the subscriber of the plurality of subscribers of the communications services provider, said source records of said each of said plurality of physical devices and said Internet Protocol (IP) addresses of the subscriber of the plurality of subscribers of the communications services provider; and
d. storing, by the at least one computer processor, said subscriber organized source records in at least one data repository; and
e. creating at least one actionable result based on said source records comprising:
  a. providing detailed usage statistics or results, by subscriber, comprising:
    i. websites accessed; and
    ii. HTTP requests opened; and
  b. providing backup detail for data access network resources comprising:
    i. providing backup detail for billing for consumption or nonconsumption billing utilization;
    ii. providing backup detail for use in retail applications;
    iii. providing backup detail for use in nonretail applications;
    iv. providing backup detail for use in wholesale applications;
    v. providing backup detail for use in Internet Service Provider (ISP) usage tracking;
    vi. providing backup detail for mobile phone usage statistics tracking;
    vii. providing backup detail for mobile device usage statistics tracking; and
    viii. providing backup detail for independent verification of third party roaming volume.

23. The method according to claim 22, wherein said receiving compressed source records comprises: receiving a plurality of feeds from a plurality of probes.

24. The method according to claim 22, wherein said compressed source records comprise: encrypted compressed source records and further comprising: decrypting said encrypted compressed source records.

25. The method according to claim 22, further comprising:
creating at least one actionable result based on said source records comprising at least one of:
  a. providing detailed usage statistics or results, by subscriber, comprising at least one of:
    i. websites accessed, or
    ii. HTTP requests opened; or
  b. providing backup detail for data access network resources comprising at least one of:
    i. for billing for consumption or nonconsumption billing utilization;
    ii. for use in retail applications;
    iii. for use in nonretail applications;
    iv. for use in wholesale applications;
    v. for use in Internet Service Provider (ISP) usage tracking;
    vi. for mobile phone usage statistics tracking;
    vii. for mobile device usage statistics tracking; or
    viii. for independent verification of third party roaming volume.

26. The method according to claim 22, further comprising:
loading said subscriber organized source records;
enriching said subscriber organized source records comprising:
  enriching in a shallow manner comprising:
    looking up a name;
    looking up a domain name service (DNS);
    using an IP address to determine location;
    enriching with a location;
    enriching with a site;
    enriching with an address;
    enriching with an owner;
    determining identity of user of IP address;
    determining who owns the name;
    enriching with a site category;
    enriching with a subscriber;
    associating a pricing plan;
    associating device information;
    determining cost information;
    determining a device causing a spike in traffic at a given time;
    determining a subscriber causing a spike in traffic at a given time;
    determining popular sites for a given device;
    determining a website attracting most traffic;
    identifying subscribers using a social networking site;
    categorizing sites and tieing to a subscriber;
    determining a percentage of traffic on portal versus off portal;
    determining a domain visited consistently by at least a given percentage of users over a given period of time including over a lengthy period of time of up to a year or more;
    determining a domain gaining in popularity over a given period of time including up to a month, or more;
    determining usage of a given application store over a period of time;
    determining a percentage of users accessing a carrier portal;
    determining most popular video content providers;
    determining most popular audio content providers;
    determining most popular gaming portals;
    determining most popular digital radio stations;
    determining most popular content portals; and
    determining carrier costing information to carry at least one of a call, session, or interaction; and
  enriching in a deep manner comprising:
    fingerprinting a device;
    identifying a device;
    determining a type of device;
    determining if there are discrepancies with expectations;
    identifying content;
    identifying audio content;
    identifying video content;
    identifying application content;

identifying game content;
enriching with compliance;
enriching with determining whether acceptable use;
determining whether there is a digital rights management (DRM) violation;
determining whether someone is transferring an iTunes file from a non-iTunes location;
determining types of content being downloaded;
determining average pages visited per session;
determining support for billing detail;
determining other customer activity when streaming music;
determining correlations between types of usage;
determining correlations between activity and at least one of: online or on session activity;
determining whether at least one of customers, devices or plans, having devices ideal for music streaming, actually use the devices for music streaming;
determining whether TV streamers are also social networkers;
determining correlations between different types of activity;
determining customer segments adopting technologies;
determining customer segments associated with content;
determining demographics of users associated with content;
determining customer segments adopting instant messaging;
determining average number of voice over Internet Protocol (VoIP) sessions per month;
determining correlations between VoIP usage and Skype usage;
determining correlations between VoIP usage and other content;
determining trends based on usage of a given content type;
determining cannibalization of services;
determining how simple message system (SMS) usage changes upon adopting instant messaging (IM);
determining evolution of content usage over time;
determining cannibalization of standard voice usage by VoIP usage;
determining split between at least two of application, browser or widget initiated traffic;
determining product mix;
determining insight from an advertising perspective;
determining subscribers generating advertising revenue;
determining subscribers generating advertising revenue for a given advertiser;
determining proportion of music from on-portal music store;
determining proportion of games downloaded from on-portal application store;
determining proportion of applications downloaded from on-portal application store;
determining proportion of content downloaded from on-portal content store;
determining a given number of popular games off portal downloaded for a given time period;
determining a given proportion of activity at least one of on-portal, or off-portal;
determining proportion of content off portal or on portal downloaded over a given time period;
determining subscribers illegally downloading digital-rights-management (DRM) protected content;
identifying VoIP activity in distributed environment;
determining and storing long term trend data centrally;
and
determining whether someone is transferring an iTunes file from an iTunes location.

* * * * *